US009112789B2

(12) United States Patent
Anand et al.

(10) Patent No.: US 9,112,789 B2
(45) Date of Patent: Aug. 18, 2015

(54) METHOD AND APPARATUS FOR SIMPLIFYING PLANNING AND TRACKING OF MULTIPLE INSTALLATION CONFIGURATIONS

(75) Inventors: Ramasubramanian Anand, Plainfield, IL (US); Hector Ayala, Chicago, IL (US); Kenneth M. Fisher, Aurora, IL (US); David W. Jenkins, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 943 days.

(21) Appl. No.: 12/228,826

(22) Filed: Aug. 15, 2008

(65) Prior Publication Data
US 2010/0042989 A1 Feb. 18, 2010

(51) Int. Cl.
*G06F 15/177* (2006.01)
*H04L 12/24* (2006.01)

(52) U.S. Cl.
CPC .............. *H04L 41/145* (2013.01); *H04L 41/18* (2013.01)

(58) Field of Classification Search
USPC .......................... 709/221, 202, 220, 223, 224
See application file for complete search history.

(56) References Cited

U.S. PATENT DOCUMENTS

| 5,027,079 | A | 6/1991 | Desurvire et al. |
|---|---|---|---|
| 6,323,994 | B1 | 11/2001 | Li et al. |
| 6,466,972 | B1 * | 10/2002 | Paul et al. ..................... 709/222 |
| 6,834,109 | B1 | 12/2004 | Pare, Jr. et al. |
| 6,952,529 | B1 | 10/2005 | Mittal |
| 7,038,837 | B2 | 5/2006 | Ng et al. |
| 7,046,426 | B2 | 5/2006 | Ng et al. |
| 7,047,496 | B2 | 5/2006 | Nelles et al. |
| 7,096,176 | B1 | 8/2006 | Hess |
| 7,096,502 | B1 | 8/2006 | Fox et al. |
| 7,623,785 | B2 | 11/2009 | Krishnaswamy et al. |
| 7,684,696 | B1 | 3/2010 | Hadden et al. |

(Continued)

FOREIGN PATENT DOCUMENTS

WO    WO 01/47170 A2    6/2001

OTHER PUBLICATIONS

U.S. Appl. No. 11/354,705, filed Feb. 14, 2006.

(Continued)

*Primary Examiner* — Lan-Dai T Truong
(74) *Attorney, Agent, or Firm* — Hamilton, Brook, Smith & Reynolds, P.C.

(57) ABSTRACT

When planning and maintaining a network, it may be very difficult for a network provider to organize variations of equipment rack installations at several different sites. Present methods of planning installation configurations in a network involve planning the same equipment installation configuration at all sites, planning a limited number of variations, or planning multiple variations but, with difficulty, tracking and changing configurations. A method or corresponding apparatus in an example embodiment of the present invention provides a tool for simplifying the planning of multiple network element installation configurations at multiple sites within a network. The benefits include fewer required truck rolls, resulting in reduced costs before and after deployment of installation configurations. In one embodiment, the disclosed planning tool allows users to access and change generic installation configurations according to customizable options to allow users to produce and store customized templates of multiple network element installation configurations.

32 Claims, 22 Drawing Sheets

(56) References Cited

U.S. PATENT DOCUMENTS

| | | | |
|---|---|---|---|
| 7,697,455 B2 | 4/2010 | Sadanada | |
| 7,703,091 B1* | 4/2010 | Martin et al. | 717/174 |
| 8,078,435 B2 | 12/2011 | Jenkins et al. | |
| 8,447,181 B2 | 5/2013 | Jenkins et al. | |
| 8,467,678 B2 | 6/2013 | Jenkins et al. | |
| 8,712,237 B2 | 4/2014 | Jenkins et al. | |
| 8,873,956 B2 | 10/2014 | Leung | |
| 2002/0176386 A1* | 11/2002 | Singh | 370/338 |
| 2003/0011846 A1 | 1/2003 | Gholamhosseini et al. | |
| 2003/0020977 A1 | 1/2003 | Smith et al. | |
| 2003/0071985 A1 | 4/2003 | Mori et al. | |
| 2003/0099014 A1 | 5/2003 | Egner et al. | |
| 2003/0099018 A1 | 5/2003 | Singh et al. | |
| 2003/0200149 A1* | 10/2003 | Gonzalez et al. | 705/26 |
| 2004/0016002 A1* | 1/2004 | Handelman et al. | 725/152 |
| 2004/0047026 A1 | 3/2004 | Ng et al. | |
| 2004/0047028 A1 | 3/2004 | Ng et al. | |
| 2004/0123284 A1* | 6/2004 | Bryant et al. | 717/174 |
| 2004/0143428 A1* | 7/2004 | Rappaport et al. | 703/22 |
| 2004/0186701 A1 | 9/2004 | Aubin et al. | |
| 2004/0208535 A1 | 10/2004 | Bragg et al. | |
| 2004/0208576 A1 | 10/2004 | Kinoshita et al. | |
| 2004/0214577 A1 | 10/2004 | Borst et al. | |
| 2004/0251962 A1 | 12/2004 | Rosnell et al. | |
| 2005/0036788 A1 | 2/2005 | Matsuoka et al. | |
| 2005/0041600 A1 | 2/2005 | Moffatt et al. | |
| 2005/0066016 A1* | 3/2005 | Bailey et al. | 709/220 |
| 2005/0123027 A1 | 6/2005 | Cioffi et al. | |
| 2005/0175279 A1 | 8/2005 | Nakajima et al. | |
| 2005/0220136 A1 | 10/2005 | Shinomiya et al. | |
| 2006/0019679 A1 | 1/2006 | Rappaport et al. | |
| 2006/0067694 A1 | 3/2006 | Nozu | |
| 2006/0287740 A1* | 12/2006 | Ertel | 700/65 |
| 2007/0172040 A1* | 7/2007 | Cesarini et al. | 379/126 |
| 2007/0253712 A1 | 11/2007 | Katagiri et al. | |
| 2007/0294342 A1 | 12/2007 | Shah et al. | |
| 2008/0123586 A1 | 5/2008 | Manser | |
| 2008/0181609 A1 | 7/2008 | Yi et al. | |
| 2008/0279552 A1 | 11/2008 | Ou et al. | |
| 2009/0060505 A1 | 3/2009 | Bernstein et al. | |
| 2009/0060512 A1 | 3/2009 | Bernstein et al. | |
| 2009/0103453 A1 | 4/2009 | Hand et al. | |
| 2009/0144700 A1* | 6/2009 | Huff et al. | 717/121 |
| 2009/0196602 A1 | 8/2009 | Saunders et al. | |
| 2010/0040364 A1 | 2/2010 | Jenkins et al. | |
| 2010/0040365 A1 | 2/2010 | Leung | |
| 2010/0040366 A1 | 2/2010 | Jenkins et al. | |
| 2010/0042390 A1 | 2/2010 | Jenkins et al. | |
| 2010/0042989 A1 | 2/2010 | Anand et al. | |
| 2010/0142943 A1 | 6/2010 | Frankel et al. | |
| 2010/0303473 A1 | 12/2010 | Alfiad et al. | |
| 2013/0251360 A1 | 9/2013 | Jenkins et al. | |
| 2013/0272697 A1 | 10/2013 | Jenkins et al. | |

OTHER PUBLICATIONS

U.S. Appl. No. 12/228,762, filed Aug. 15, 2008.
U.S. Appl. No. 12/228,763, filed Aug. 15, 2008.
U.S. Appl. No. 12/228,776, filed Aug. 15, 2008.
Momtahan, P., "The Case for Integrating Next-Generation Transport," (White Paper 74.1707E) Tellabs, (Rev. B: Feb. 2007).
Jenkins, D. W. and Scholtens, D. A., "Metro WDM Network Design & Evolution: Positioning for the Transition to Optical Meshes," (White Paper 74.1717E), Tellabs, (Rev. A: Oct. 2006).
Papakos, K., et al., "Optical Dynamic Core Networks: Design, Implementation and Engineering Considerations,"(White Paper 74.1825E) Tellabs, (Rev. A: Apr. 2007).
"Ber vs. Osnr," *Circadiant Tech Brief,* (Tech Brief No. TB007), (Feb. 2003).
Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005).
çokrak, A.Cem and Altuncu, A., "Gain and Noise Figure Performance of Erbium Doped Fiber Amplifiers (EDFA)," *J. of Electrical & Electronics Engineering (Istanbul University)*, 4(2):1111-1122 (Jun. 15, 2004).
Papakos, K., et al., "Optical Dynamic Core Networks: Design, Implementation and Engineering Considerations," (White Paper 74.1825E) Tellabes, (Rev. A: Apr. 2007).
Non-published U.S. Appl. No. 11/354,705, filed Feb. 14, 2006.
Non-published U.S. Appl. No. 12/228,762, filed Aug. 15, 2008.
Non-published U.S. Appl. No. 12/228,776, filed Aug. 15, 2008.
Non-published U.S. Appl. No. 12/228,763, filed Aug. 15, 2008.

* cited by examiner

| TEMPLATE FAMILY NAME | NON-CUSTOMIZABLE INSTALLATION ATTRIBUTES 415 | CUSTOMIZABLE USER OPTIONS 410 | | | |
|---|---|---|---|---|---|
| | HW | UserOpt1 | UserOpt2 | UserOpt3 | UserOpt4 |
| SBOADM | FP 2.x | NA | | | |
| NetOLT | FP 2.x | NA | | | |
| 4D_2shlf | FP 3.x | NA | | | |
| 4D_1shlf | FP 3.x | NA | | | |
| 8D_MSMS | FP 3.x | NO | | | |
| 8D_MSPS | FP 3.x | YES | | | |
| NWTN | FP 3.x | NA | | | |
| Nano_V | 7100N | NA | NA | | |
| Nano_H | 7100N | NA | NA | | |

CUSTOMIZABLE TEMPLATES IN TABULAR FORM 400

LIST OF CUSTOMIZABLE TEMPLATES 405

GENERIC INSTALLATION CONFIGURATIONS 420

CUSTOMIZABLE TEMPLATES IN TABULAR FORM 400

LIST OF CUSTOMIZABLE TEMPLATES 405

NON-CUSTOMIZABLE INSTALLATION ATTRIBUTES 415

GENERIC INSTALLATION CONFIGURATIONS 420

| TEMPLATE FAMILY NAME | FAMILY | HW | MAXIMUM DEGREES | SHELVES/ BAY | MAIN SHELVES | PORT SHELVES | SPACER RACKS |
|---|---|---|---|---|---|---|---|
| SBOADM | SBOADM | FP 2.x | 2 | 3 | 1 | >1 | 2 |
| NetOLT | NetOLT | FP 2.x | 4 | 3 | 2 | >1 | 2 |
| 4D_2shlf | 4D_2shlf | FP 3.x | 4 | 2 | 1 | >1 | 0or2 |
| 4D_1shlf | 4D_1shlf | FP 3.x | 8 | 2 | 2 | >1 | 2 |
| 8D_MSMS | 8D_MSMS | FP 3.x | 8 | 2 | 2 | >1 | 0or2 |
| 8D_MSPS | 8D_MSPS | FP 3.x | 4 | 1 | 1 | >1 | 0 |
| NWTN | NWTN | FP 3.x | 8 | 1 | 2 | >1 | 0 |
| Nano_V | Nano_V | Nano | 2 | 4 | 1 | >1 | 0 |
| Nano_H | Nano_H | Nano | 2 | 4 | 1 | >1 | 0 |
| Template10 | 8D_MSPS | FP 3.x | 8 | 2 | 2 | >1 | 0or2 |

| SAME BAY MAIN | PORT MODULE ON MAIN | EXTRA PORT SHELF | NEBS/ETS | USAGE | SPACER | EqptPlacement | MainPackKits | PortPackKits |
|---|---|---|---|---|---|---|---|---|
| YES | NO | NO | NEBS | YES | 6 INCH | LeftOrRight Spacer | NO KITS | NO KITS |
| NO | NO | NO | NEBS | YES | 6 INCH | LeftOrRight Spacer | NO KITS | NO KITS |
| NO | NO | NO | NEBS | YES | 6 INCH | LeftOrRight Spacer | NO KITS | NO KITS |
| YES | NO | NO | NEBS | NO | 6 INCH | LeftOrRight Spacer | NO KITS | NO KITS |
| NO | NO | NO | NEBS | YES | 6 INCH | LeftOrRight Spacer | NO KITS | NO KITS |
| NO | NO | NO | NEBS | NO | NONE | Top Spacer Shelf | 71 NWTN-MS | 71 NWTN-PS |
| NO | NO | NO | NEBS | YES | NONE | Top Spacer Shelf | 71 NWTN-MS | 71 NWTN-PS |
| NO | NO | NO | NEBS | YES | NONE | TopOrBottom Nano Spacer Shelf | 81.0717MS-KIT-A | 81.0717PS-KIT-A |
| NO | NO | NO | NEBS | YES | NONE | TopOrBottom Nano Spacer Shelf | 81.0717MS-KIT-C | 81.0717PS-KIT-C |
| NO | YES | NO | NEBS | YES | 6 INCH | LeftOrRight Spacer | RACKKIT-AB | NO KITS |

CUSTOMIZABLE USER OPTIONS 410

FIG. 4B-II

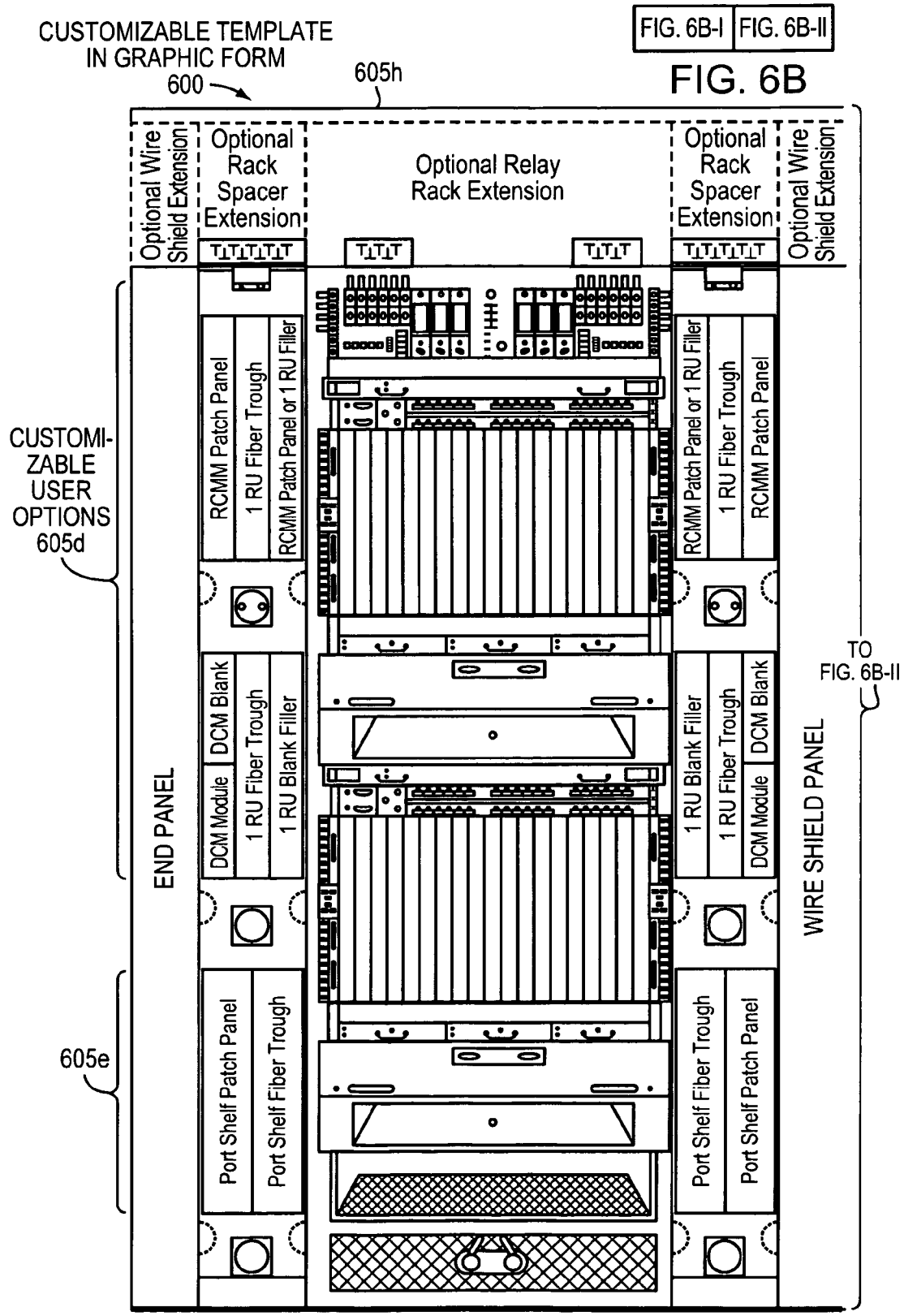
FIG. 6B-I

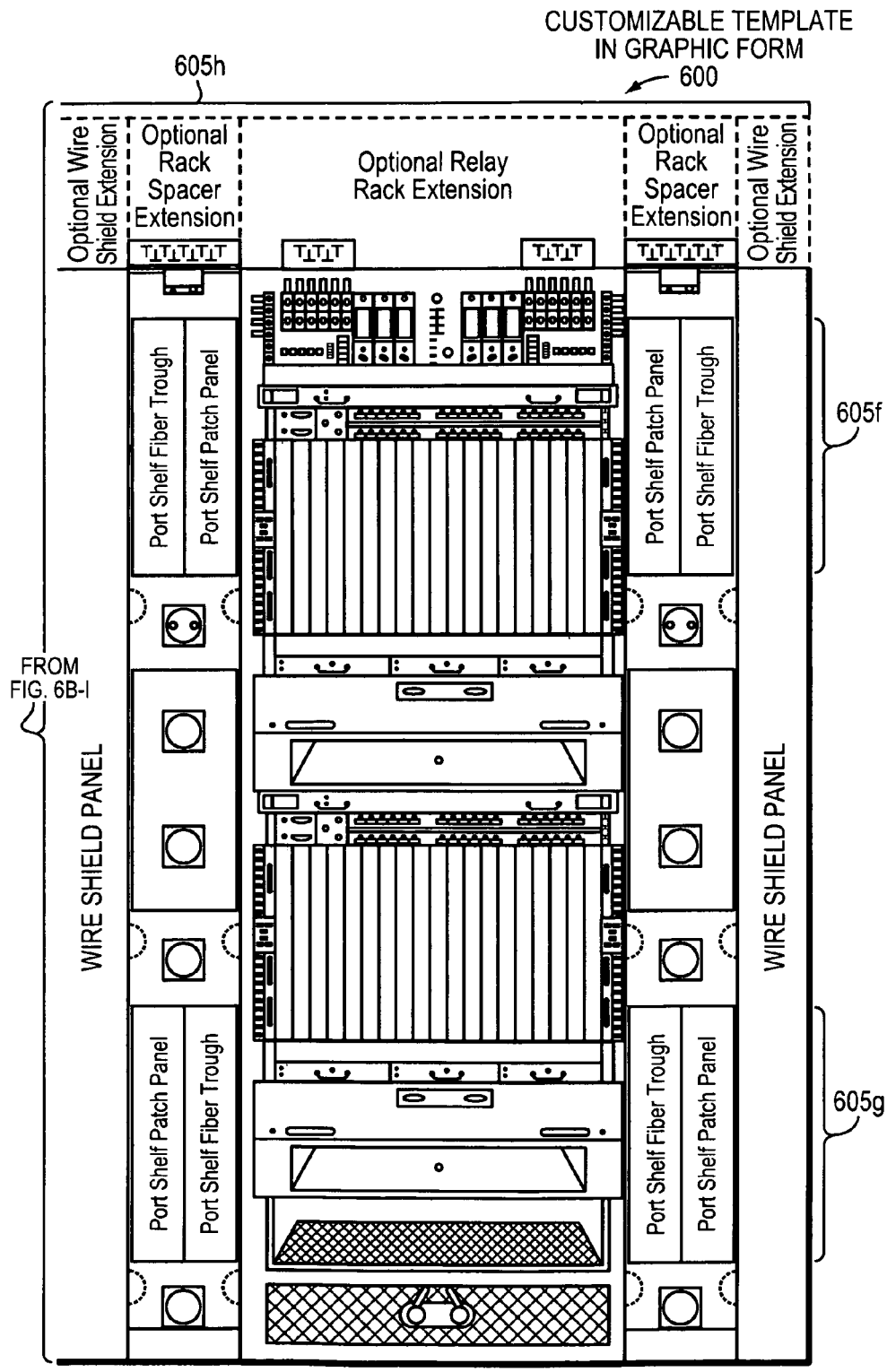
FIG. 6B-II

METHOD OF UPDATING
CUSTOMIZED TEMPLATES
1000

ENABLE USER TO ACCESS
STORED CUSTOMIZED TEMPLATES
1005

ENABLE USER TO UPDATE
CUSTOMIZED TEMPLATES
1010

STORE UPDATED
CUSTOMIZED TEMPLATES
1015

FIG. 10

METHOD OF ASSOCIATING
CUSTOMIZED TEMPLATES
WITH A NETWORK REPRESENTATION
1100

ENABLE USER TO ACCESS REPRESENTATIONS OF THE
NETWORK ELEMENT INSTALLATION CONFIGURATIONS
1105

ENABLE USER TO ASSOCIATE CUSTOMIZED TEMPLATES
WITH A NETWORK REPRESENTATION
1110

STORE TEMPLATE - NETWORK ASSOCIATIONS
1115

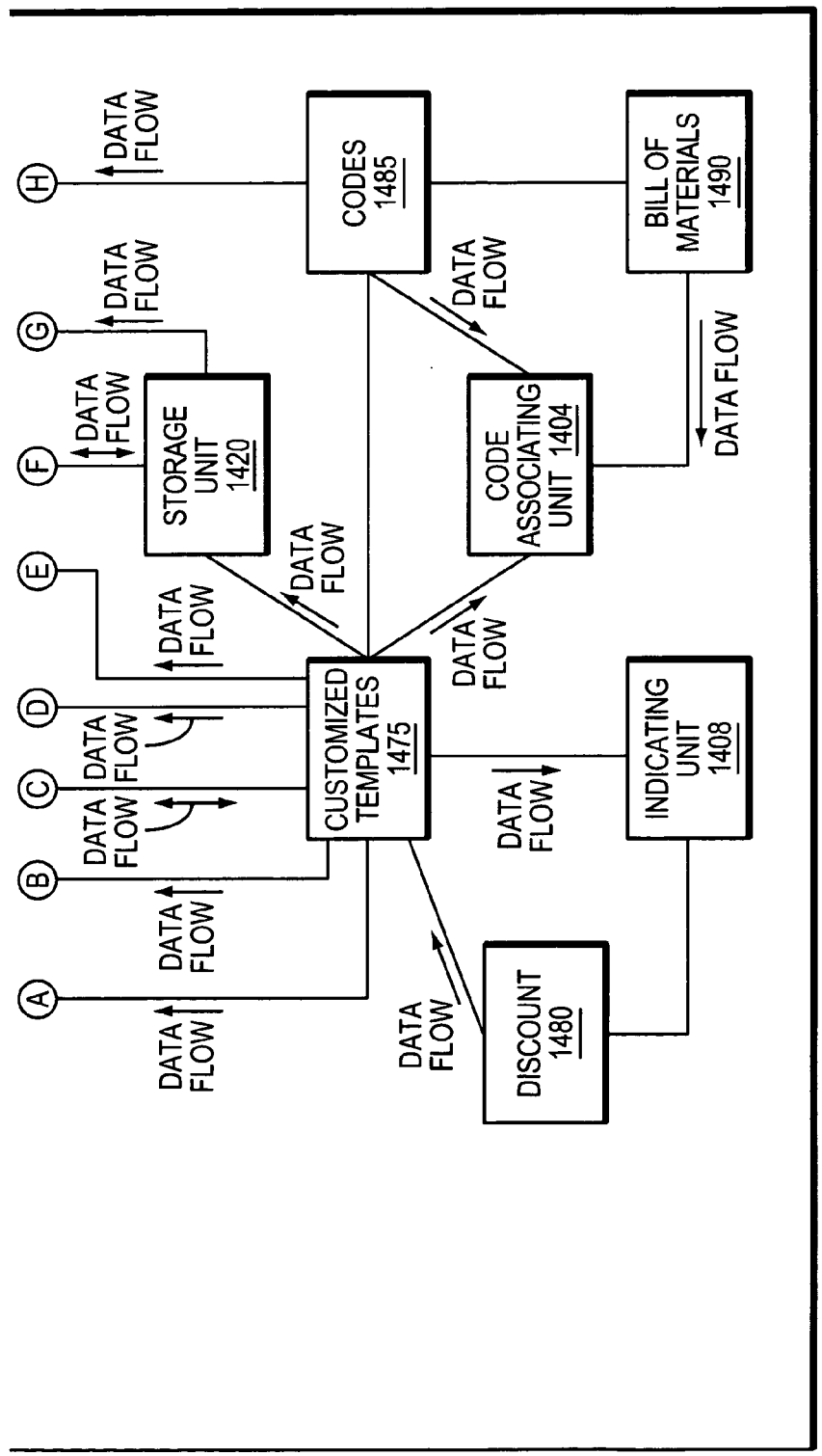
FIG. 14A-II

METHOD AND APPARATUS FOR SIMPLIFYING PLANNING AND TRACKING OF MULTIPLE INSTALLATION CONFIGURATIONS

RELATED INVENTION

This application is related to U.S. application Ser. No. 11/354,705, filed on Feb. 14, 2006; and U.S. application Ser. No. 12/228,762, filed Aug. 15, 2008, now U.S. Pat. No. 8,078,435; U.S. application Ser. No. 12/228,763, filed Aug. 15, 2008, now U.S. Pat. No. 8,712,237; and U.S. application Ser. Nos. 12/228,763, 12/228,776, filed Aug. 15, 2008, now U.S. Pat. No. 8,447,181. The entire teachings of the above applications are incorporated herein by reference.

BACKGROUND OF THE INVENTION

An optical network, such as a ring network, mesh network, or hybrid ring/mesh network, may contain several sites or nodes with optical network elements, such as optical add/drop multiplexers, optical cross-connects, amplifiers, regenerators, transponders, filters, routers, wavelength switches, wavelength converters, and wavelength selectors. Network providers must manage several optical network elements within an optical network. Many network elements may be designed for various configurations. Each network site may have a different network element installation configuration based on power, space, traffic flow, network demand, and other constraints or user preferences.

Planning, deploying, tracking, and updating multiple installation configurations at each of these sites may be a difficult, expensive, and time consuming proposition. Network providers need to correctly anticipate customer demand while building reliable networks as inexpensively as possible. In addition, network providers must also anticipate future technological developments, such as increased data rates, to simplify network upgrades. Some network providers may attempt to minimize cost of additional truck rolls and reduce network complexity by pre-planning network element installation configurations prior to deployment of the installation configurations.

It is also difficult to standardize the order management process to keep pace accurately with a network provider's equipment order changes for different network elements and shipment of the ordered equipment. Further, if the equipment is grouped by ordering codes, it becomes more problematic to keep track of the various network element installation configuration combinations in order to generate an accurate bill of materials (BoM).

At present, many network providers choose to standardize the network element installation configurations at all network sites to simplify the planning and tracking process rather than customizing the configurations on a per site basis. Other network providers attempt to maintain multiple network element installation configurations where one or more installation configurations differs from site to site. However, this approach falls short when there is no method or apparatus to plan or keep track of these differing installation configurations.

Further, network providers have different network element installation configuration preferences. These preferences may be based on power, space, cable run locations, or other types of constraints or user preferences. For example, some network providers prefer equipment (e.g. port cards and controllers) on different shelves whereas others prefer all the equipment on a single shelf.

SUMMARY OF THE INVENTION

A method or corresponding apparatus in an example embodiment of the present invention provides a procedure to enable users to simplify planning of multiple network element installation configurations in specific sites within a network. An example embodiment of the procedure enables users to access generic installation configurations of a network element. After accessing the generic installation configurations, the procedure may display the customizable templates to a user that include the generic installation configurations and customizable options within the generic installation configurations which allows the user to select or customize a customizable template. Next, the user is allowed to produce customized templates of multiple network element installation configurations by changing the customizable options of the generic installation configurations. After the user finishes making changes to the customizable user options in a generic installation configuration of a network element, the customized templates may be stored.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-B are example embodiments of customizable templates in tabular format containing generic installation configurations of an optical network element with customizable options.

FIGS. 6A-B are example embodiments of customizable templates in graphical format containing generic installation configurations of an optical network element with customizable user options.

FIGS. 8, 9, 10, 11, and 12 are flow charts representative of example methods of planning multiple network element installation configurations.

DETAILED DESCRIPTION OF THE INVENTION

A method or corresponding apparatus in an example embodiment of the present invention enables users such as network providers to visualize and plan how optical network element equipment is placed and configured on racks at specific sites within an optical network. Advanced network planning using an example embodiment of this invention enables network providers to reduce equipment deployment and configuration costs by minimizing the number of truck rolls and service calls required to make post-deployment changes to network element installation configurations. Further, some embodiments of this invention allow users to manage and track post-deployment configuration changes conveniently on a single user workstation or application.

Example embodiments of this invention allow users to create and store customized templates produced from configuring customizable user options of generic installation configurations. Customizable templates allow users to configure the installation configurations of multiple network elements within a given network on a site-by-site basis to suit users' specific needs. Customizable templates also allow users to replicate installation configurations easily from one site to another and keep configurations up-to-date. Additionally, example embodiments of this invention allow users to associate the customized templates with equipment ordering codes and discounts to simplify the order management and deployment process and track the configurations on a site by site basis.

Example embodiments of the present invention provide a method or apparatus for planning and tracking multiple network element installation configurations in metropolitan wavelength-division multiplexing (WDM) networks.

A description of the forgoing and other example embodiments of the invention follows.

Figure 1:
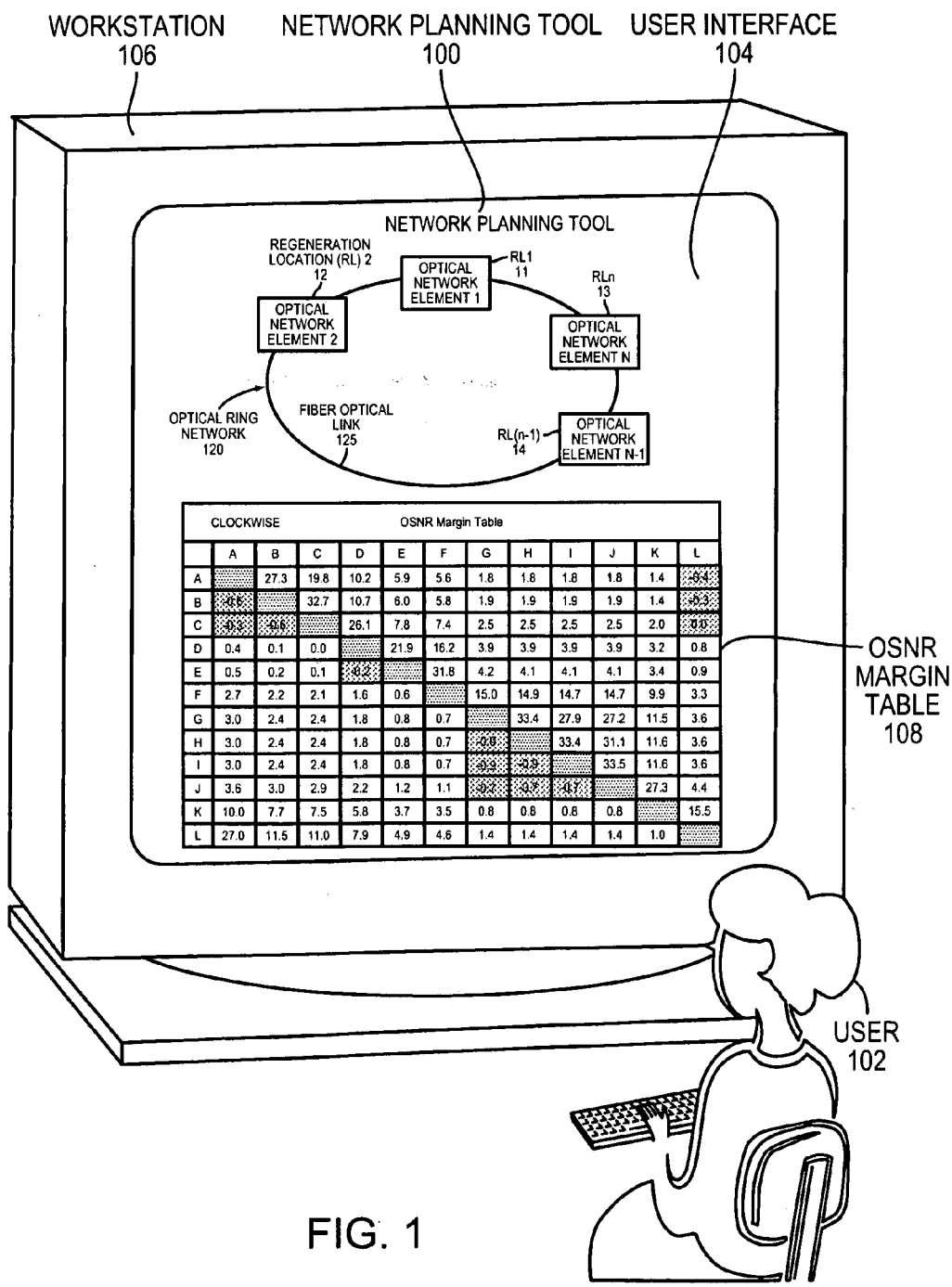
FIG. 1 is a diagram of a user planning deployment of optical regeneration locations in an optical network.

FIG. 1 is a diagram of a user 102 planning deployment of an optical ring network 120 using an example embodiment of a network planning tool 100. To use the example planning tool 100, the user 102 enters characteristics of the proposed optical network via a user interface 104, such as a workstation 106. Typical characteristics of a planned optical network 106 include network topology, number and distribution of nodes, and number, distribution and type of optical network elements, including transponders, optical amplifiers, and optical regenerators.

The optical ring network 120 being planned included multiple optical network elements 1-n. It is these elements 1-n that can have different configurations, and it is these different configurations that various embodiments of the network planning tool 100 can be effective in assisting the user 102 to plan or track over time.

A method or corresponding apparatus in an example embodiment of the present invention begins with selecting a network element in a specific site of a given network topology to access generic installation configurations. The network topology may contain multiple network elements and traffic flow patterns. The generic installation configurations may be based on optical modeling of traffic flow patterns in a network. The example method allows the user to change multiple network element installation configurations while maintaining the integrity of the traffic flow patterns.

Next, example embodiments of the procedure enable users to access generic installation configurations of a network element. After accessing the generic installation configurations, the procedure may display the customizable templates to a user that include the generic installation configurations and customizable options within the generic installation configurations which allows the user to select or customize a customizable template. In some embodiments, the customizable templates may be displayed to the user in tabular format, graphical format, pictorial format, or a combination of these formats.

The user is then allowed to produce customized templates of multiple network element installation configurations by changing the customizable options of the generic installation configurations. The tool maintains the integrity of the traffic flow patterns by accounting for, for example, amplification or regeneration of optical signals within the traffic flow patterns and allows the user to change and apply the customized templates consistent with maintaining the integrity of the traffic flow patterns. The tool may also allow the user to change the generic installation configurations according to user preferences, such as power, space, network demand and other constraints or user preferences.

If the user decides to change the customizable options of a generic installation configuration and create a customized network element installation configuration template, codes may be associated with the equipment contained in the customized template. In some embodiments, a discount may apply to certain customized templates. If a discount applies to a customized template or templates, the tool may indicate to the user that the discount applies to the particular template configuration.

The tool then enables the user to order network element installation configurations or equipment using the codes associated with the templates. Next, the tool may associate a bill of materials with the codes.

After the user finishes making changes to the customizable user options in a generic installation configuration of a network element, the customized templates may be stored.

To update a previously customized template, the tool enables the user to access the stored customized template. After the user selects a stored customized template to update, the tool enables the user to update the customized template. Next, the tool may store the updated customized template after the user indicates that he or she has completed making changes to the template.

The tool enables the user to access stored customized templates and associate the customized templates of network element installation configurations with one or multiple sites in a network representation. The tool then stores the associations of the network representations associated with the network element installation configurations.

Some embodiments of the tool enable the user to access stored customized templates and delete these templates.

Continuing to refer to FIG. 1, one application for which the network planning tool 100 may be used is to plan deployment of optical regeneration locations in the optical ring network 120. The user 102 may also enter an expected or measured loss between nodes, or the planning tool 100 may estimate the loss based on distance between nodes 125, optical fiber type, and other parameters, such as optical signal-to-noise ratio (OSNR) and chromatic dispersion (CD). Once the user 102 finishes creating the model of the optical network 120, the planning tool 100 may compute an OSNR margin table 108 based on loss between nodes and characteristics of the optical regenerators to be deployed. After calculating the OSNR margin table 108, the planning tool 100 iterates through different arrangements of optical regeneration locations 11-14 in the model optical network 120. Once the planning tool 100 completes the iterations, it reports indications of the final model to the user 102 via a display, such a graphical user interface 104.

Figure 2:
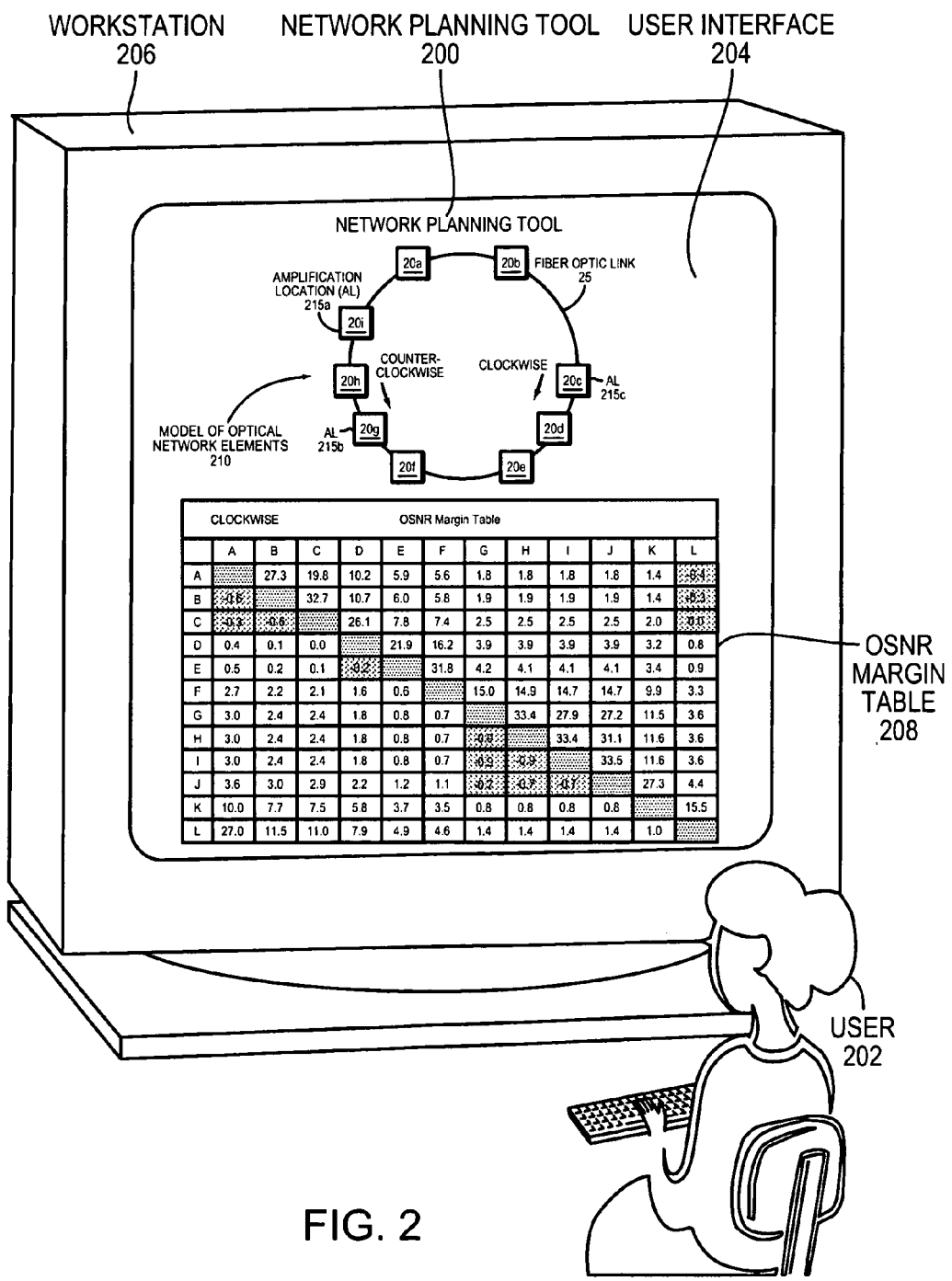
FIG. 2 is a diagram of a user planning deployment of optical amplification locations in an optical network.

FIG. 2 is a diagram of a user 202 planning the deployment of optical amplification locations 215*a-c* in an optical network using an example embodiment 200 of the referenced planning tool. As in FIG. 1, to use the example planning tool 200, the user 202 enters characteristics of the proposed optical network, such as nodes 20*a-j*, optical fiber links 25, and optical amplifiers (not shown) via a user interface 204, such as a workstation 206. As in FIG. 1, once the user finishes creating the model of the optical network 210, the planning tool 200 computes an OSNR margin table 208 based on loss between nodes and characteristics of the optical amplifiers to be deployed. After calculating the OSNR margin table 208, the planning tool 200 iterates through different arrangements of optical amplification locations 215*a-c* in the model optical network. Once the planning tools completes the iterations, it reports indications of the final model to the user 102 via a display such a graphical user interface 204.

Figure 3A:
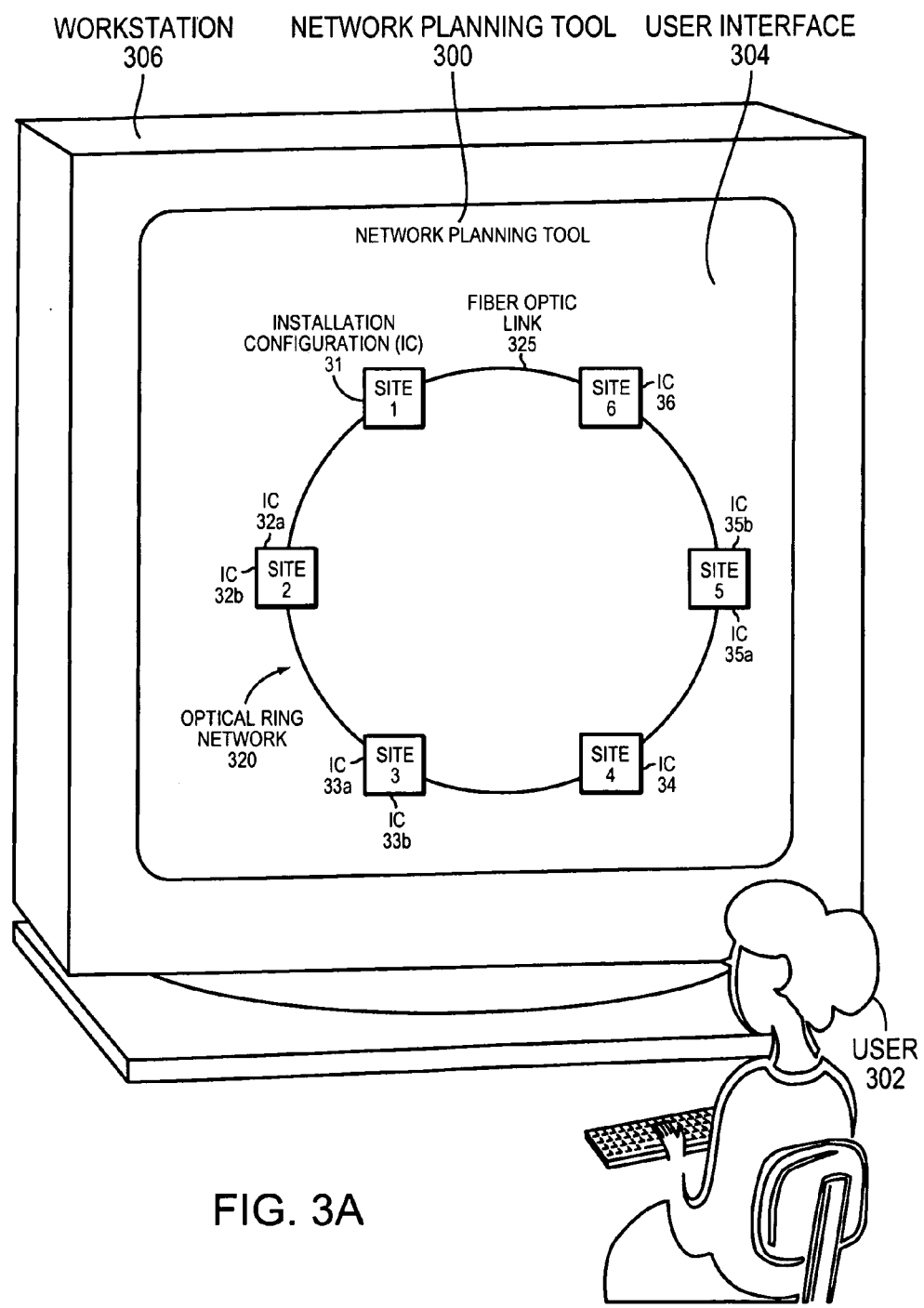
FIG. 3A is a diagram of a user planning the installation configurations of optical network elements in an optical ring network using an example embodiment of the present invention.
Figure 3B:
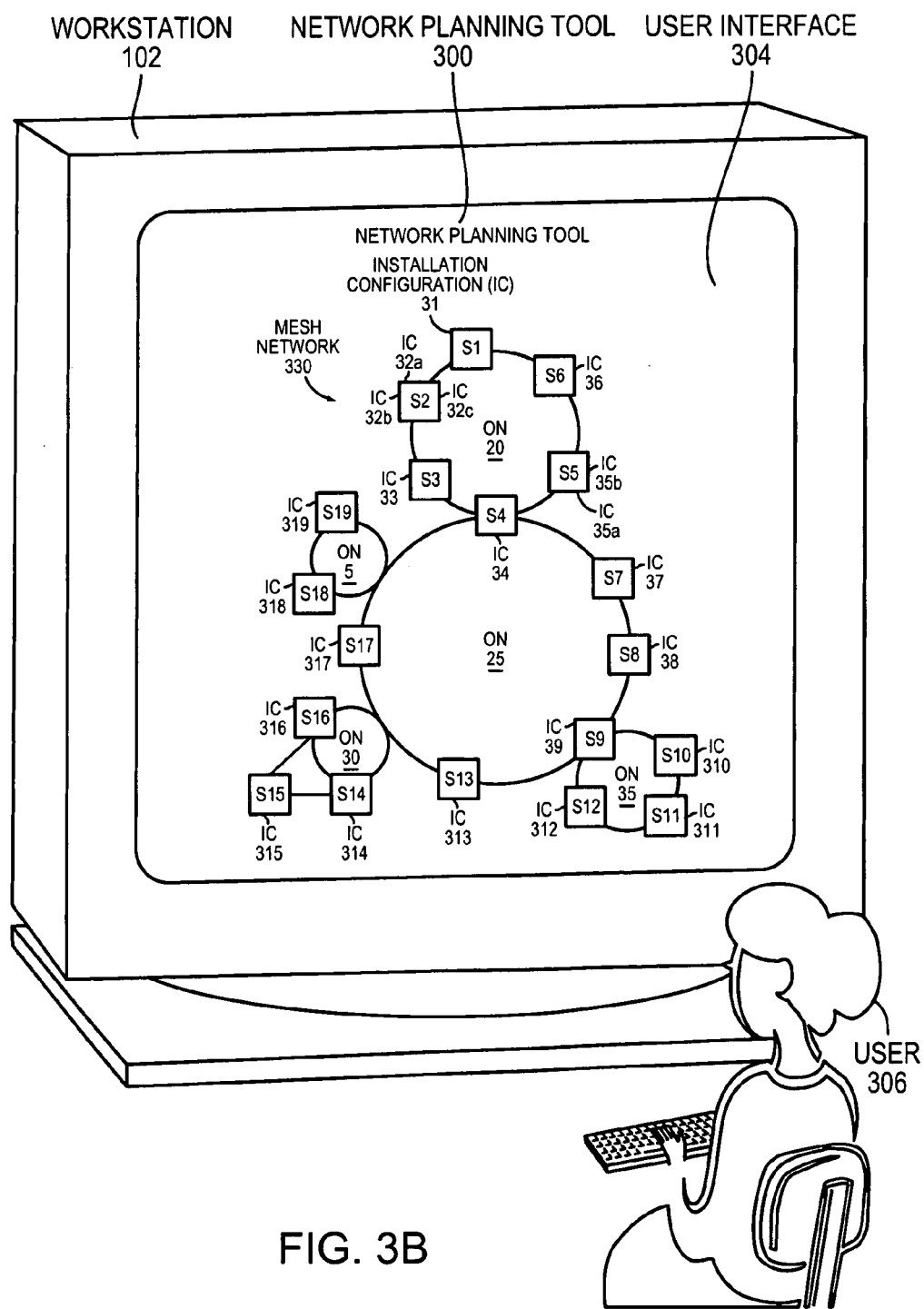
FIG. 3B is a schematic view of a user planning the installation configurations of optical network elements in the optical mesh network using an example embodiment of the present invention.

FIGS. 3A and 3B are diagrams of a user 302 planning the installation configuration 31-39, 311-319 of optical network elements in an optical ring network 320 and an optical mesh network 330 using an example embodiment 300 of the disclosed network planning tool. To use an example embodiment of the network planning tool 300, a user adds sites 1-19 to the network planning tool 300 via a user interface 304 on a workstation 306 and connects the sites with fiber optic links 325 to create a model network topology. Sites 1-19 may contain one node or multiple nodes and no network elements or multiple network elements. Some nodes in the network may not require equipment. Each network element or node may contain multiple pieces of equipment that may be configured or installed in several different ways.

In some embodiments, different icons within a site may represent different network elements or different equipment within a network element. For the sites that contain equipment, templates may be used to specify how the equipment is configured at the site. After creating the model topology of a network, the user 302 may change the installation configuration of specific network elements by either clicking on an installation configuration link 31-39, 311-319 associated with a specific site, clicking on a network element within a site, or clicking on the site 1-19 via a user interface 304, such as a workstation 306. In another embodiment, the user 302 may change the installation configuration of a specific network element by selecting a specific site listed in a navigation tree format. The user 306 is then be able to select and configure a specific network element within a specific site of the network by creating a new customizable network element installation configuration template or updating an existing customizable template.

FIGS. 4A and 4B are example embodiments of customizable templates of multiple generic network element installation configurations in tabular format 400. The generic installation configurations 420 for each customizable template 405 may include non-customizable installation attributes 415, which may not be changed by a user and customizable user options 410, which may be changed by a user. In the example embodiments of FIGS. 4A and 4B example embodiments, the list of customizable templates are organized by template family 405. Organization by template family 405 is one way to allow multiple combinations of network element installation configurations to be included for customization by a user. Each template family 405 may contain different non-customizable installation attributes 415 and customize user options 410 based on attributes that will be available for user customization.

Non-customizable network element installation configurations 415 for each template family 405 may include, for example, associated hardware, maximum number of degrees, maximum number of shelves per bay, number of main shelves, number of port shelves, and number of spacer racks. The customizable user options 410 for each template family 405 may, for example, allow the user to specify if port modules are allowed on the main shelf of a certain network element, allow the user to specify if both main shelves will be in the same bay (e.g. if there are two main shelves for the system), allow the user to specify that both the shelves in a rack or bay need to be added to the bill of materials even if one of the shelves has no equipment associated with it (e.g. if the configuration has a main shelf and a port shelf in the same bay), allow the user to specify that side spacers are required in the configuration, allow the user to specify the available rack kit that may be associated in the bill of materials for the bay configurations, and allow the user to specify that the network element configuration is being designed for Network Equipment-Building System (NEBS), a standard of environmental and safety guidelines for telecommunications equipment used in the United States or European Telecommunications Standards Institute (ETSI), a standard for telecommunications in Europe.

In some embodiments, the tool may have one interface in which a user may view both the non-customizable installation attributes 415 and the customizable user options 410 in tabular format. In these embodiment, the user may change the customizable installation configurations 410 directly on the tabular template to produce customized templates of a network element installation configuration 400.

In yet another embodiment, the tool may create tabular customizable templates of a network element installation configuration for each template family based on selected customizable user options 410 for that family. In another embodiment, the tool may create graphical templates of a network element installation configuration for each template family based on selected user options for that family (FIGS. 5A-C and FIGS. 6A-B). In yet another embodiment, the tool may create pictorial templates of a network element installation configuration for each template family based on selected user options for that family (FIG. 7). In these embodiments, the customizable user options may be initially selected from a drop down list in a table, a list of options in navigation tree format, or some other format via which a user may choose from customizable installation configuration options.

In some embodiments, the tool may set a default option for each template family 405 based on certain global options. In some example embodiments, the network planning tool may allow multiple templates to be created for each template family and allow the user to designate a default template to be used within each template family in which the tool contains at least one default template for each template family. If there is only one template for a template family, then that template may be designated as the default template.

In some embodiments, users may not be allowed to delete existing template families 405 or create new template families 405. In some embodiments of the disclosed invention, the user may not be able to create new template families 405 or generic installation configurations 405, but may only be able to edit the customizable user options 410 within each template family 405.

Figure 5A:
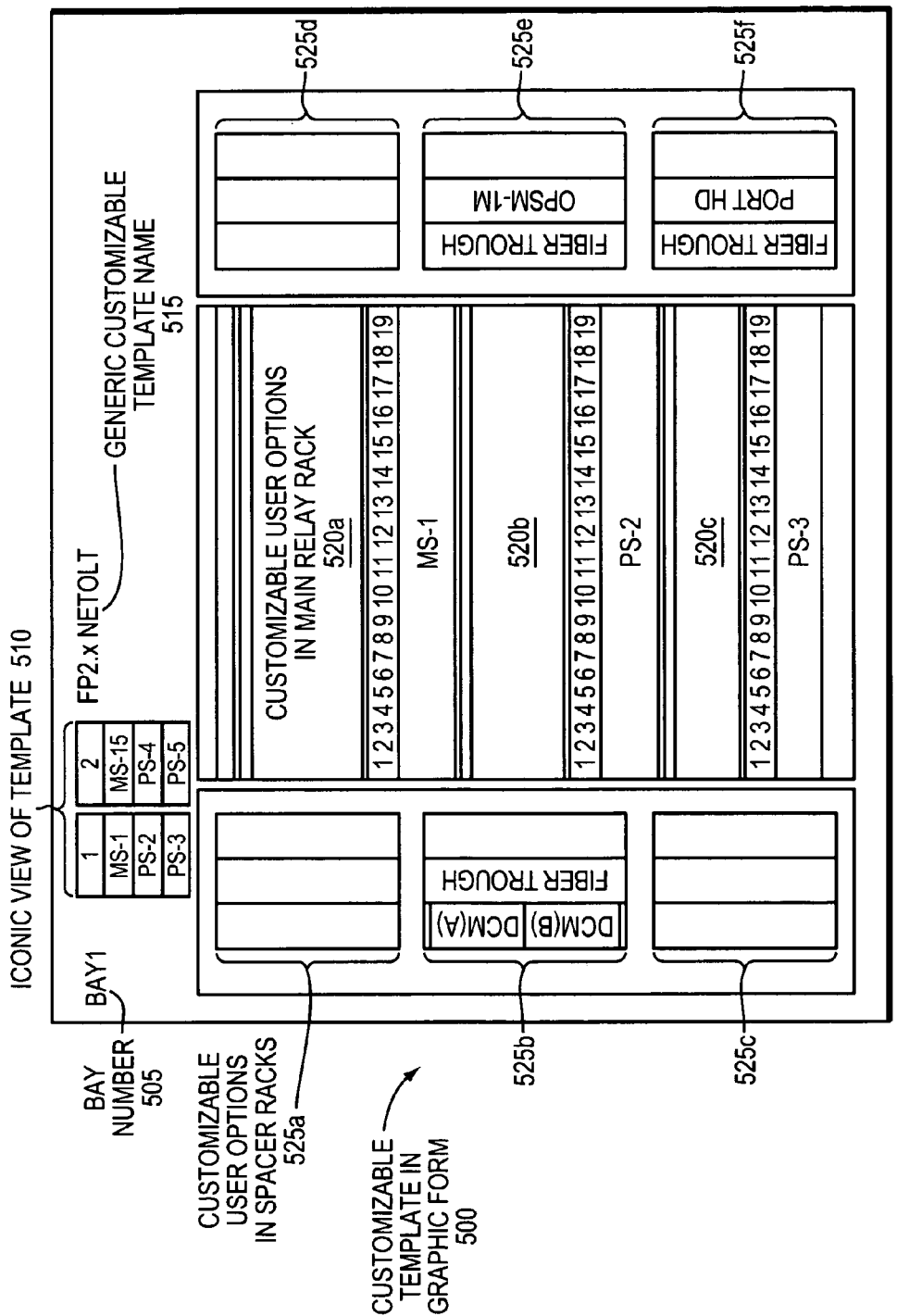
FIGS. 5A-C are example embodiments of customizable templates in graphical format containing generic installation configurations of an optical network element with customizable options.
Figure 5B:
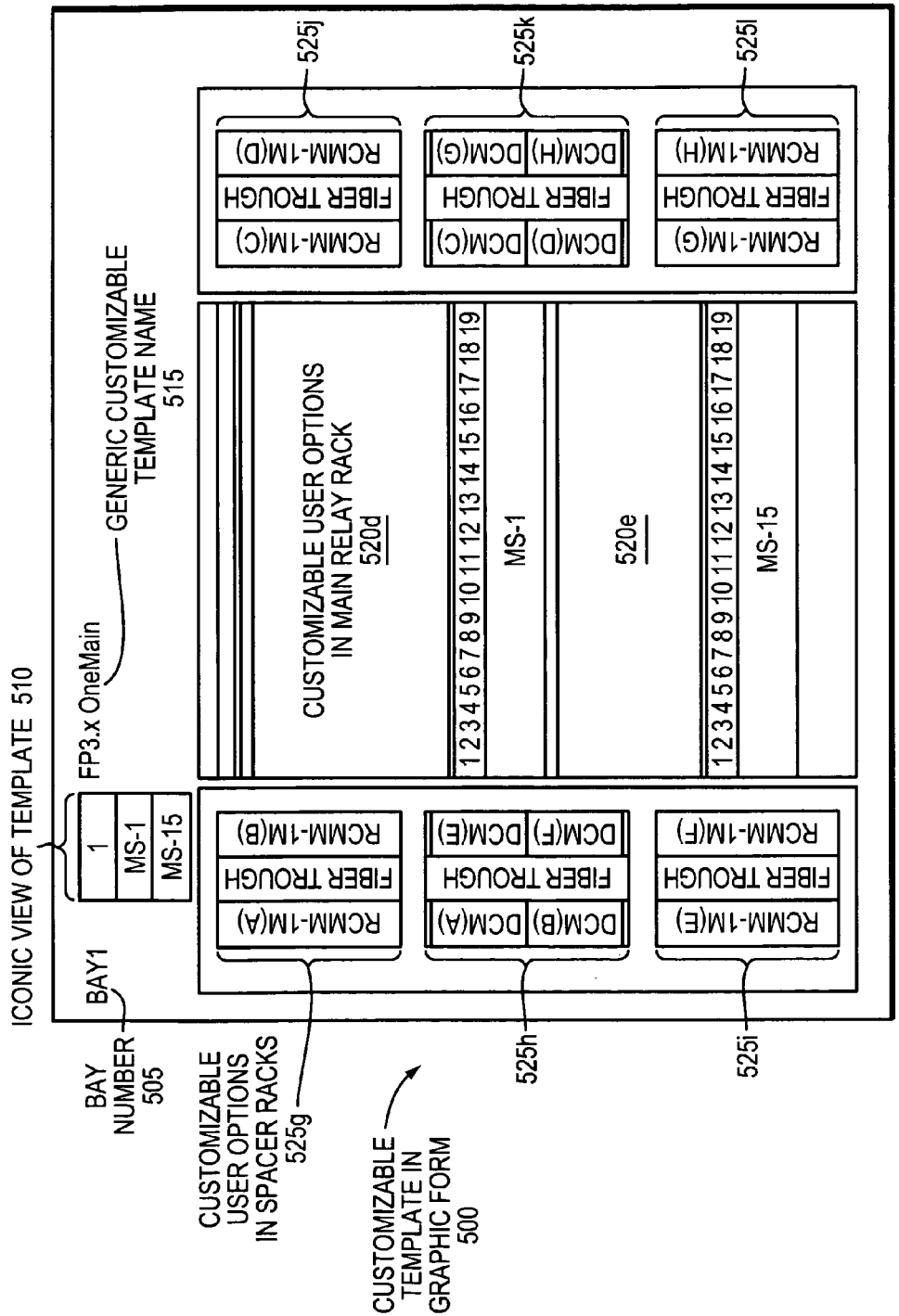
Figure 5C:
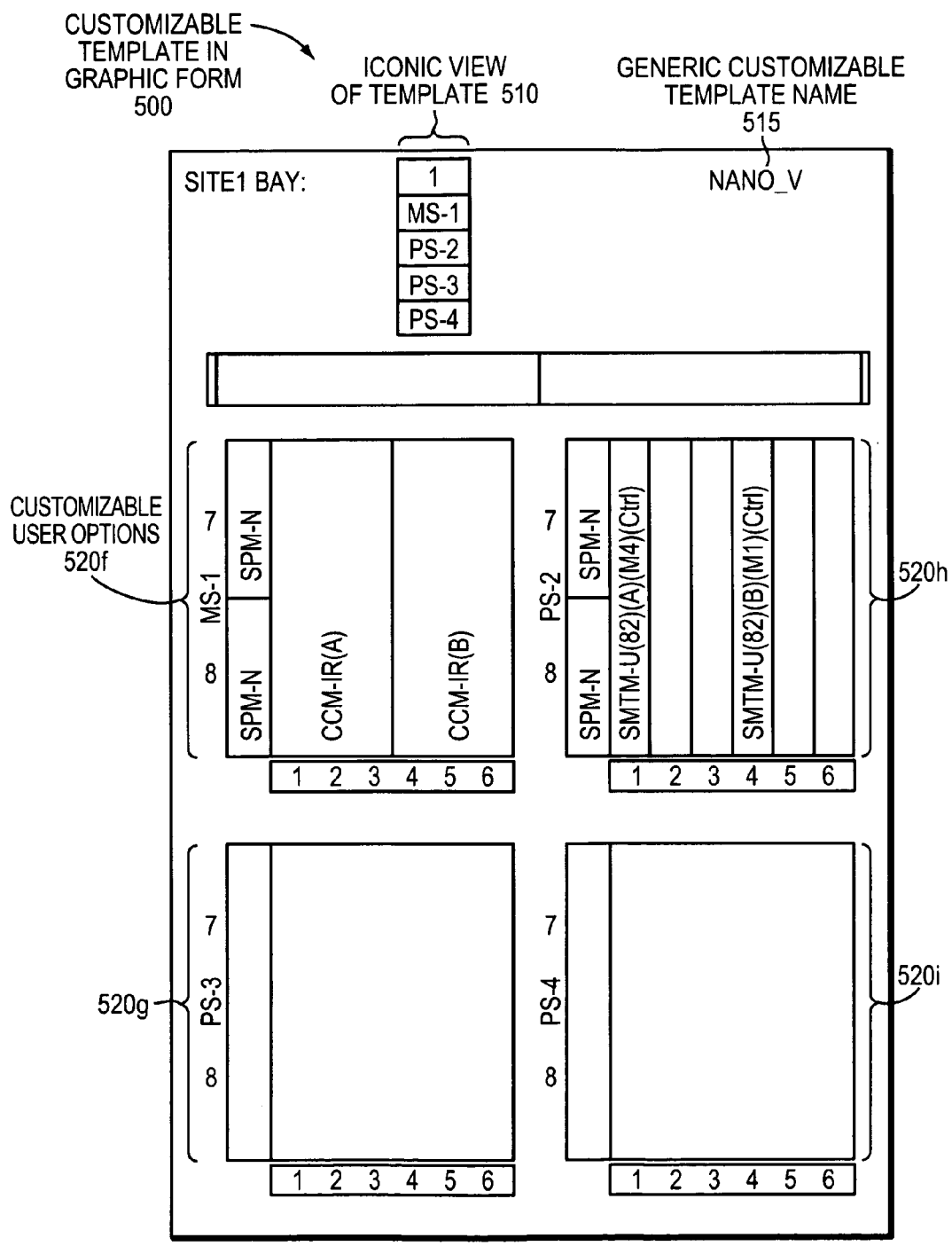

FIGS. 5A-C are example embodiments of customizable graphical templates 500 of a network element installation configuration. In some embodiments, the customizable graphical templates 500 may be generated based on previously selected user options and may be further customized in the graphical template format 500. In some embodiments, the customizable graphical templates may be selected from a list of generic installation configurations for a specific network element and contain default configurations which may be customized in the graphical template format 500.

In the FIGS. 5A-C example embodiments of a customizable template in graphical format 500, the user is able to view the graphical layout of generic installation configurations of a specific network element and change the position and configuration of equipment within the graphical template. In some embodiments, the template contains the generic customizable template name 515 and iconic views of the different bays 510 of a generic installation configuration. For templates with multiple bays, a user may click on a specific bay icon 510 to navigate among the different bay views of a template. The bay number 505 of a specific template is also displayed on the template in some embodiments of the disclosed invention. In example embodiments, a user may select, drag and drop model representations of certain equipment from one location to different location. In some embodiments, a user may be able to edit, add or delete model representations. In some embodiments, the model representations of equipment may be in the form of a graphical or pictorial image, text box, or other similar form which may be dragged or edited by a user from one location in a template to a different location in the template.

To illustrate, in the embodiment depicted in FIG. 5A, a user may click on the Dispersion Compensation Module DCM (B), equipment used in optical networks for chromatic dispersion compensation, located in the top slot of the left middle spacer rack 525b and move it to a different spacer rack slot 525a-f in the template such as the middle slot of the left bottom spacer rack 525c. Alternatively, a user may click on the Optical Protection Switch Module (OPSM-1M), equipment used to split or combine optical signals, located in the middle slot of the right middle spacer rack 525f and move it to a different spacer rack slot 525a-f in the template, such as the top slot of the left bottom spacer rack 525d. In some embodiments, a user may select and drag equipment from a slot within a specific shelf in the main relay rack 520a-e to different slot in the same shelf or a different shelf within the main relay rack 520a-e. For example, in FIG. 5B, a user may select a piece of equipment that is in slot 3 on the Main Shelf 1 (MS-1) 520d and drag it to slot 12 on the same shelf of MS-1 520d. Alternatively, a user may select a piece of equipment that is in slot 5 on Main Shelf 15 (MS-15) 520e and drag it to slot 18 on MS-1 520d. A user may also select and drag certain equipment from the spacer racks 525a-c to the main relay racks 520a-c and from the main relay racks 520a-c to the spacer racks 525a-c.

Referring to FIG. 5C, as another example embodiment, a user may select and drag, in a graphical user interface manner, a Subrate Multiplexer Transponder Module (SMTM), a variant of the transponder modules used on an optical DWDM network element, from slot 1 of Port Shelf 2 (PS-2) 520h to slot 6 of Port Shelf 4 (PS-4) 520i.

Figure 6A:
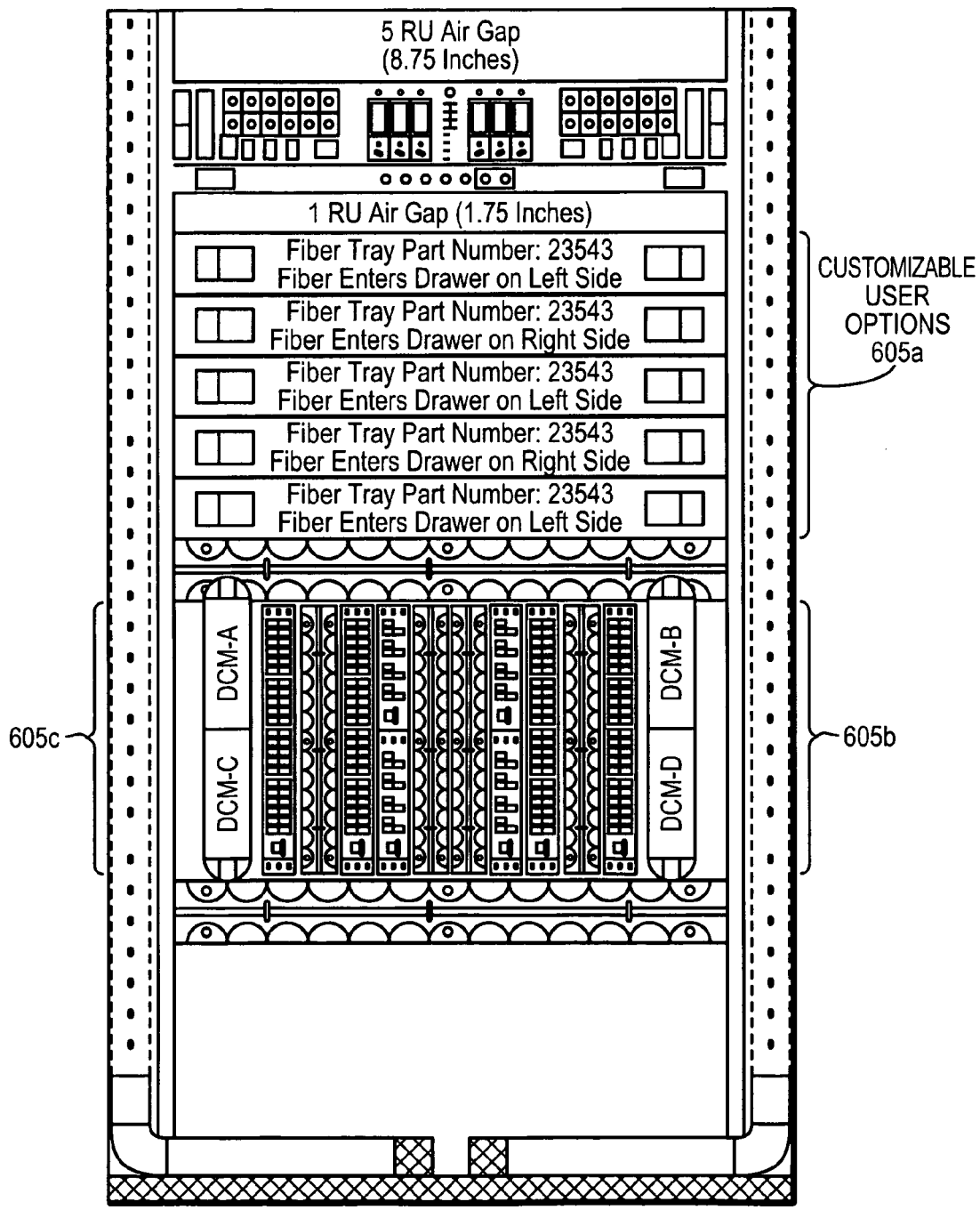
Figure 7:
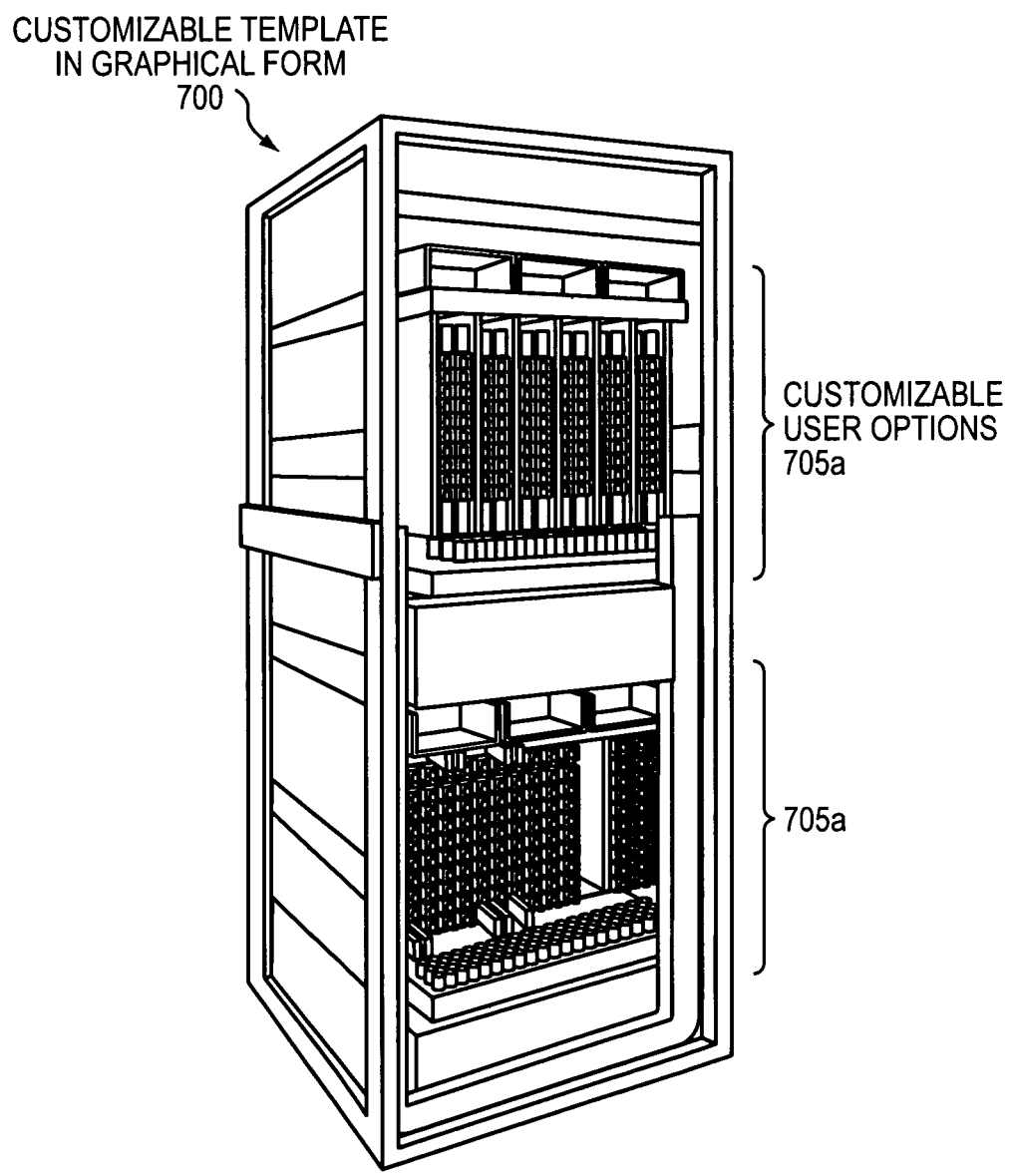
FIG. 7 is an example embodiment of a customizable template in pictorial format containing generic installation configurations of an optical network element with customizable user options.

FIGS. 6A-B are additional example embodiments of customizable graphical templates 600 of a network element installation configuration. In these example embodiments of a customizable template in graphical format 600, a user is able to view the graphical layout of a specific network element and change the position of equipment within the network element. In these embodiments, the user may select and drag specific model representations of equipment from one location to a different location on the template. For example, in FIG. 6A, a user may click the model representation of the Dispersion Compensation Module A (DCM(A)) in the top slot of the far left spacer rack 605c and drag and drop it to a different spacer rack location in the template such as the slot above DCM(B) on the far right spacer rack 605b. Referring to FIG. 6B as another example embodiment, a user may switch the position of a Reconfigurable Channel Mux Module-Patch Panel (RCMM Patch Panel) 605d, a fiber patch panel used to handle fiber interconnections between RCMMs and transponder port modules (TPMs), with the position of a Port Shelf Patch Panel 605e. In some embodiments, a user may also add equipment on to the template or delete equipment from the template.

FIG. 7 is an example embodiment of a customizable template of a network element installation configuration in pictorial format 700. In this example embodiment, a user may select and drag the model representations, such as images of customizable network element equipment 705a-b, from one equipment location in the template to a different equipment location in the template. In some embodiments, a user may also add equipment to the template or delete equipment from the template.

Some embodiments of the disclosed invention may contain a menu of equipment as a separate window within the navigation tool or on the template. In these embodiments, a user may select and drag equipment from the menu into the equipment slots on the template. Alternatively, in some embodiments a user may remove equipment from a template by either selecting and deleting a specific piece of equipment or selecting, dragging and dropping the equipment into the menu of equipment.

Example embodiments of the invention may contain specific constraints in the customizable templates that would restrict a user from moving certain equipment to certain locations, adding equipment, or deleting equipment based on limitations of the racks or equipment within a specific template family. Such limitations may include power, space, and compatibility restrictions.

Figure 8:
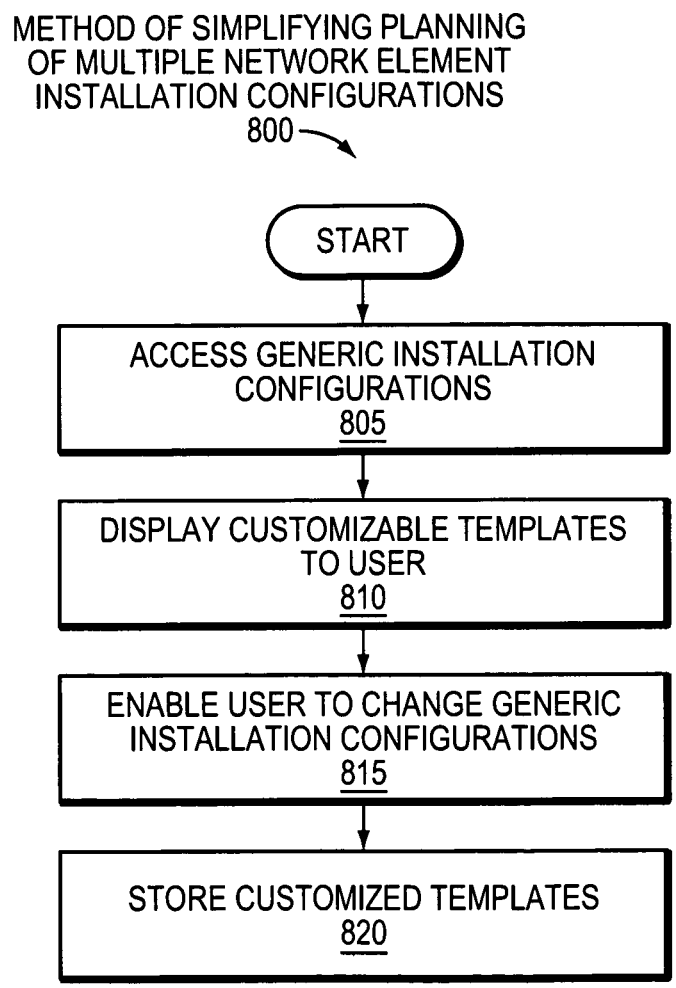

FIG. 8 is a flow chart that illustrates an example method of simplifying the planning of multiple network element installation configurations 800 according to the disclosed network planning tool. Planning begins with the user accessing generic installation configurations of a selected network element located in a specific site of a given network topology 805. Network elements may include amplifiers, regenerators, transponders and other units used in the provisioning of network services. The generic installation configurations may be categorized by template family or other grouping format.

After the user accesses the generic installation configurations, the customizable templates may be displayed to the user 810. In some embodiments, the customizable templates may be displayed to the user in tabular format, graphical format, pictorial format, or a combination of these formats. The customizable templates contain customizable user options and non-customizable installation configuration attributes for each generic installation configuration. Next, the tool enables the user to change the customizable user options of the generic installation configurations 815. In some embodiments, the user may change the network element installation configurations by selecting options from a list contained in a tabular, graphical, pictorial, or combination format template. In some embodiments, the user may change the network element installation configurations by selecting, dragging, and dropping equipment from one location to a different location on the customized template represented in tabular format, graphical format, pictorial format, or a combination of these formats. Once the user indicates that he or she has completed making changes to the network element installation configurations, the tool stores the customized template(s). In some embodiments, the template(s) may be stored in a database. In some embodiments, the template(s) may be stored on a server.

Figure 9:
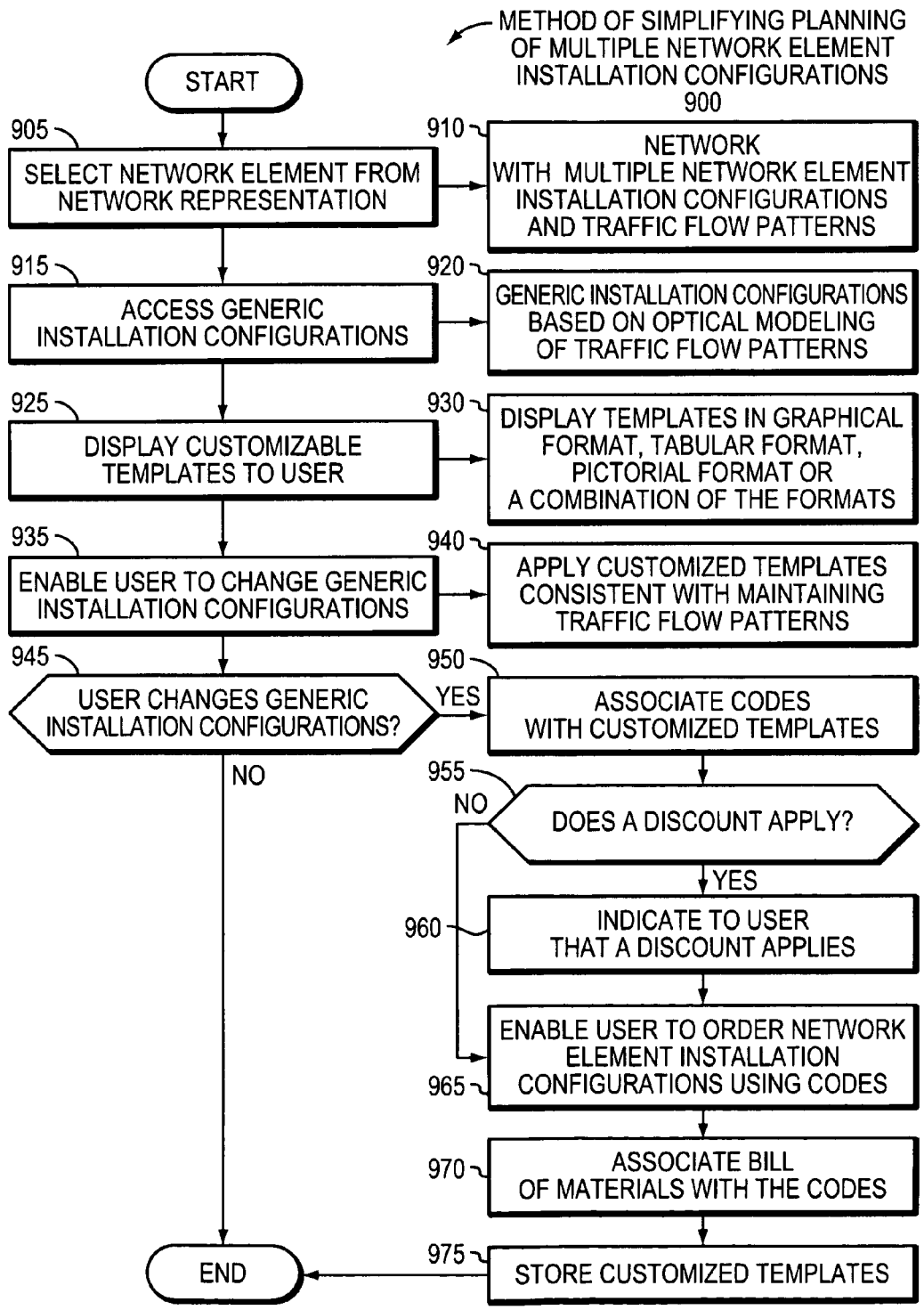

FIG. 9 is a flow chart that illustrates a second example method of simplifying planning of multiple network element installation configurations 900 according to the disclosed planning tool. As in the example illustrated in FIG. 8, planning begins with selecting a network element in a specific site of a given network topology 905 to access generic installation configurations 915. The network topology may be a ring, mesh, hybrid ring/mesh, or any other suitable topology. The network topology may contain multiple network elements and traffic flow patterns 910. Network elements may include amplifiers, regenerators, transponders and other elements used in the provisioning of network services. The different network elements in the network model may be represented by different icons or colors. For instance, an in-line amplifier may be represented by a small triangle located in a site, which is represented by larger square. The generic installation configurations may be categorized by template family or other grouping format. The generic installation configurations may be based on optical modeling of traffic flow patterns 920 in a network. The example method allows the user to change multiple network element installation configurations while maintaining the integrity of the traffic flow patterns 940.

Next, the planning tool displays the customized templates to the user 925. The templates may be displayed in tabular format, graphical format, pictorial format or a combination of these formats 930. The tool then enables the user to change the customizable user options of the generic installation configurations 935. The tool maintains the integrity of the traffic flow patterns by accounting for, for example, amplification or regeneration of optical signals within the traffic flow patterns and allows the user to change and apply the customized templates consistent with maintaining the integrity of the traffic flow patterns 940. The tool may also allow the user to change the generic installation configurations according to user preferences, such as power, space, network demand and other constraints or user preferences.

If the user decides to change the customizable options of a generic installation configuration and create a customized network element installation configuration template 945, codes may be associated with the equipment contained in the customized template 950. In some embodiments, a discount may apply to certain customized templates. These discounts may depend on the equipment associated with certain templates. If a discount applies to a customized template or templates 955, the tool may indicate to the user that the discount applies 960 to the particular template configuration.

The tool then enables the user to order network element installation configurations or equipment using the codes associated with the templates 965. An example embodiment of the codes may be equipment ordering codes used to associate specific shelf rack kits to a template and then place an order via an order management system for the shelf rack kits to be delivered to a specific network site. Next, the tool may associate a bill of materials with the codes 970, which may include any applicable discounts. Finally, the tool may store the customized template(s) 975 after the user indicates that he or she has completed making changes to the template(s). In some embodiments, the template(s) may be stored in a database or other data structure. In some embodiments, the template(s) may be stored on a server.

FIG. 10 is a flow chart that illustrates an example method of updating customized templates 1000. To update a previously customized template, the tool first enables the user to access the stored customized template 1005. In some embodiments, the user may access a stored customized template by clicking on a model representation of the network element within a particular site in a network topology and selecting an edit template option. Alternatively, a user may select a particular customized template to update from a navigation tree, which may list all of the customized templates for a given network element within a particular site. After the user selects a stored customized template to update, the tool enables the user to update the customized template 1010 by the same or a similar method as described in FIGS. 8 and 9. Next, the tool may store the updated customized template(s) 1015 after the user indicates that he or she has completed making changes to the template(s).

FIG. 11 is a flow chart that illustrates an example method of associating customized network element installation configuration templates with network representations 1100. The tool enables the user to access stored customized templates 1105 and associate the customized templates of network element installation configurations with one or multiple sites in a network representation 1110. Next, the tool stores the associations of the network representations associated with the network element installation configurations 1115. In some embodiments, these associations may be stored in a database or other data structure. In some embodiments the tool automatically associates a customized template with a particular network element located at a specific site within the a given network topology. In these embodiments, the user creates or edits a customized template by clicking on a specific network element located within a site in a given network topology. After the user creates or edits a customized template and saves the template changes, the tool automatically associates that template with a specific network element located at a specific site within the a given network topology. In some embodiments, a user may apply or replicate the same customized template associated with one site to different sites in a given network topology or sites within different network topologies.

Figure 12:
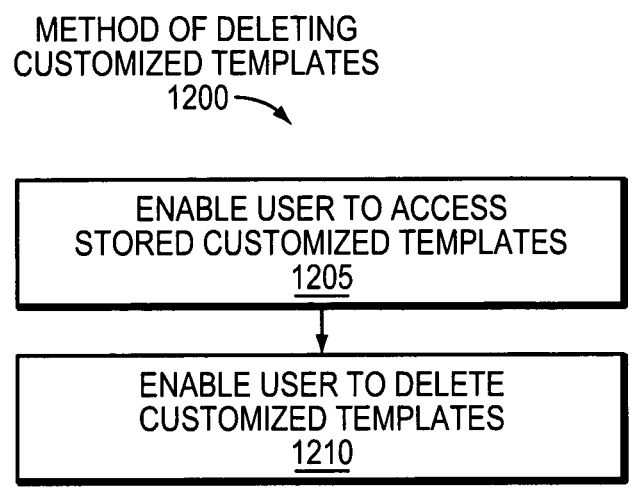

FIG. 12 is a flow chart that illustrates an example method of deleting customized templates of network element installation configurations 1200. The tool enables the user to access stored customized templates 1205 and delete these templates 1210. In some embodiments, the customized templates may be deleted from a database or other data structure by a user. In some embodiments, the user may access a stored customized template by clicking on the model representation of a network element within a particular site in a network topology and selecting an option to delete an existing customized template. Alternatively, a user may select a particular customized template to delete from a navigation tree, which may list all of the customized templates for a given network element within a particular site. In some embodiments, the tool may warn the user that he or she will no longer be able to access the customized template from the tool after it is deleted.

Figure 13:
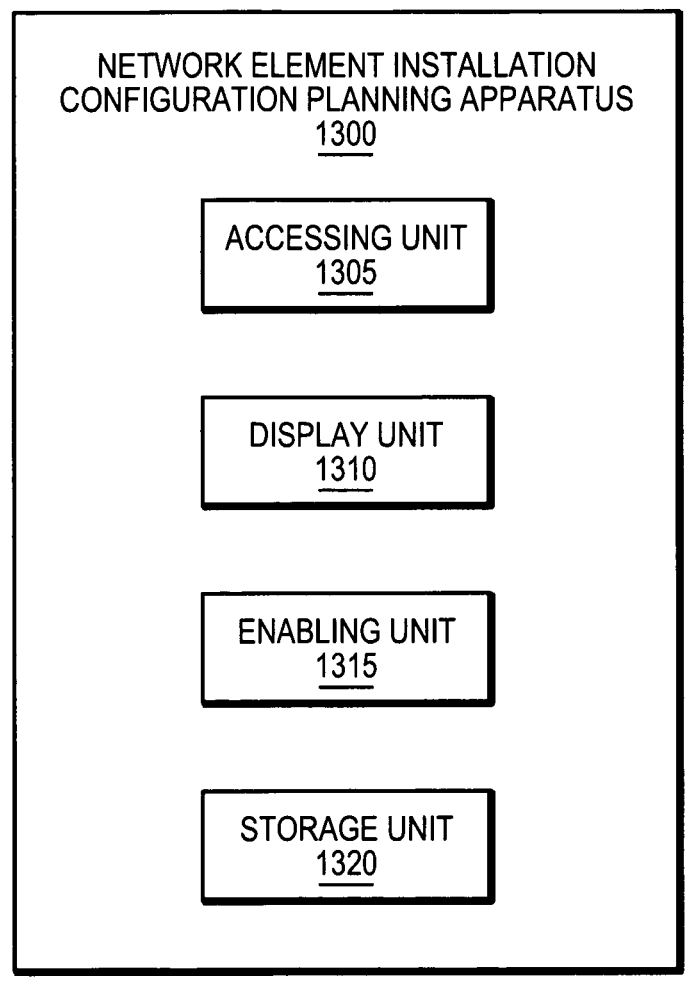
FIGS. 13 and 14A-B are block diagrams of example embodiments of a network element installation planning apparatus.

FIG. 13 is a block diagram that illustrates an example embodiment of a network element installation configuration planning apparatus 1300 according to the disclosed planning tool. The apparatus simplifies the planning of multiple network element installation configurations in an optical network, such as those shown in FIGS. 3A and 3B. The apparatus includes an accessing unit 1305, display unit 1310, enabling unit 1315, and a storage unit 1320. The accessing 1305 unit accesses stored generic installation configurations. The display unit 1310 displays customizable templates to a user that include the generic installation configurations and customizable options within the generic installation configurations to enable the user to select or customize a template. The enabling unit 1315 enables the user to change the generic installation configurations according to the customizable options to allow the user to produce customized templates of multiple network element installation configurations. The storage unit 1320 stores the customized templates.

Figure 14A:
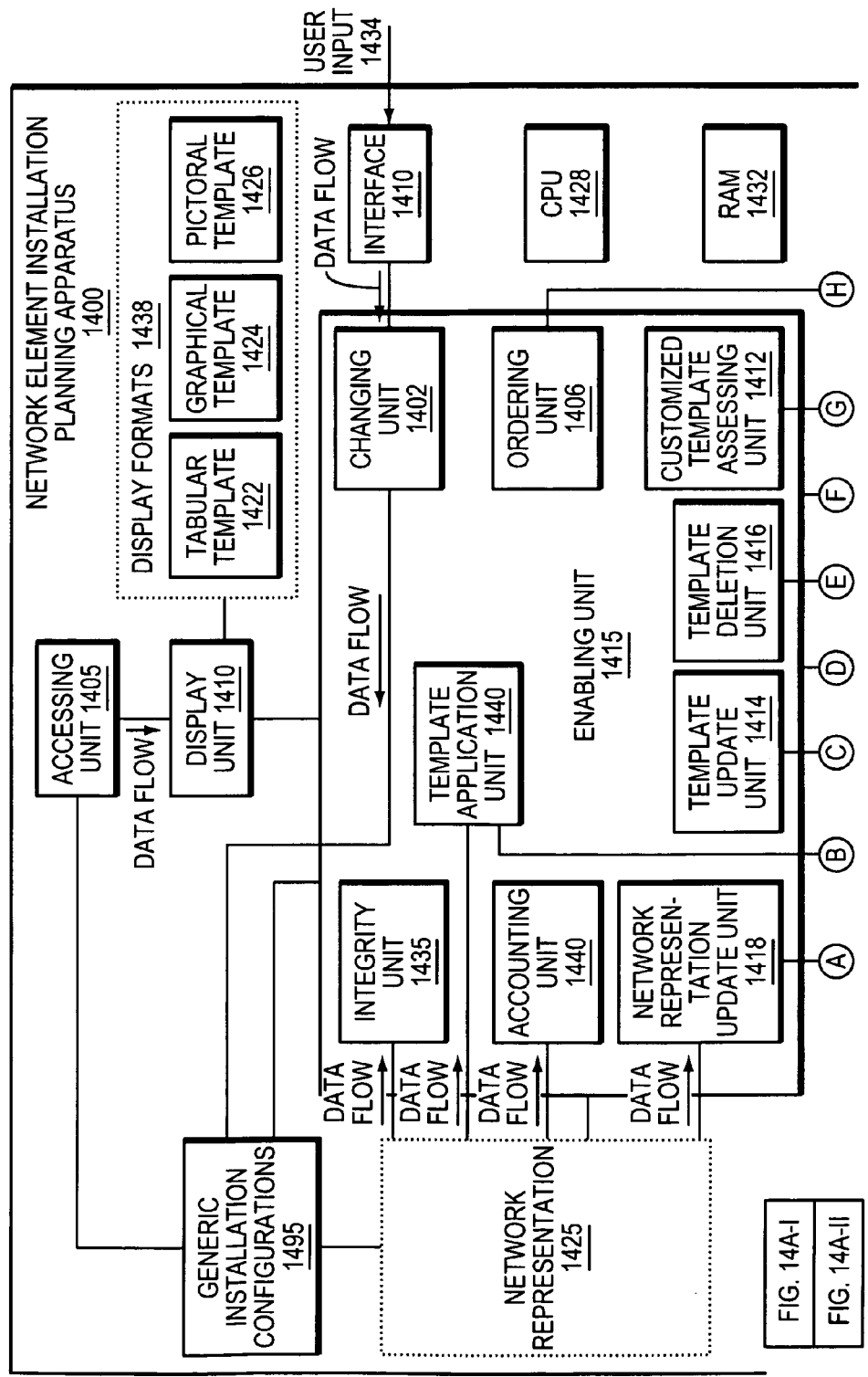
Figure 14B:
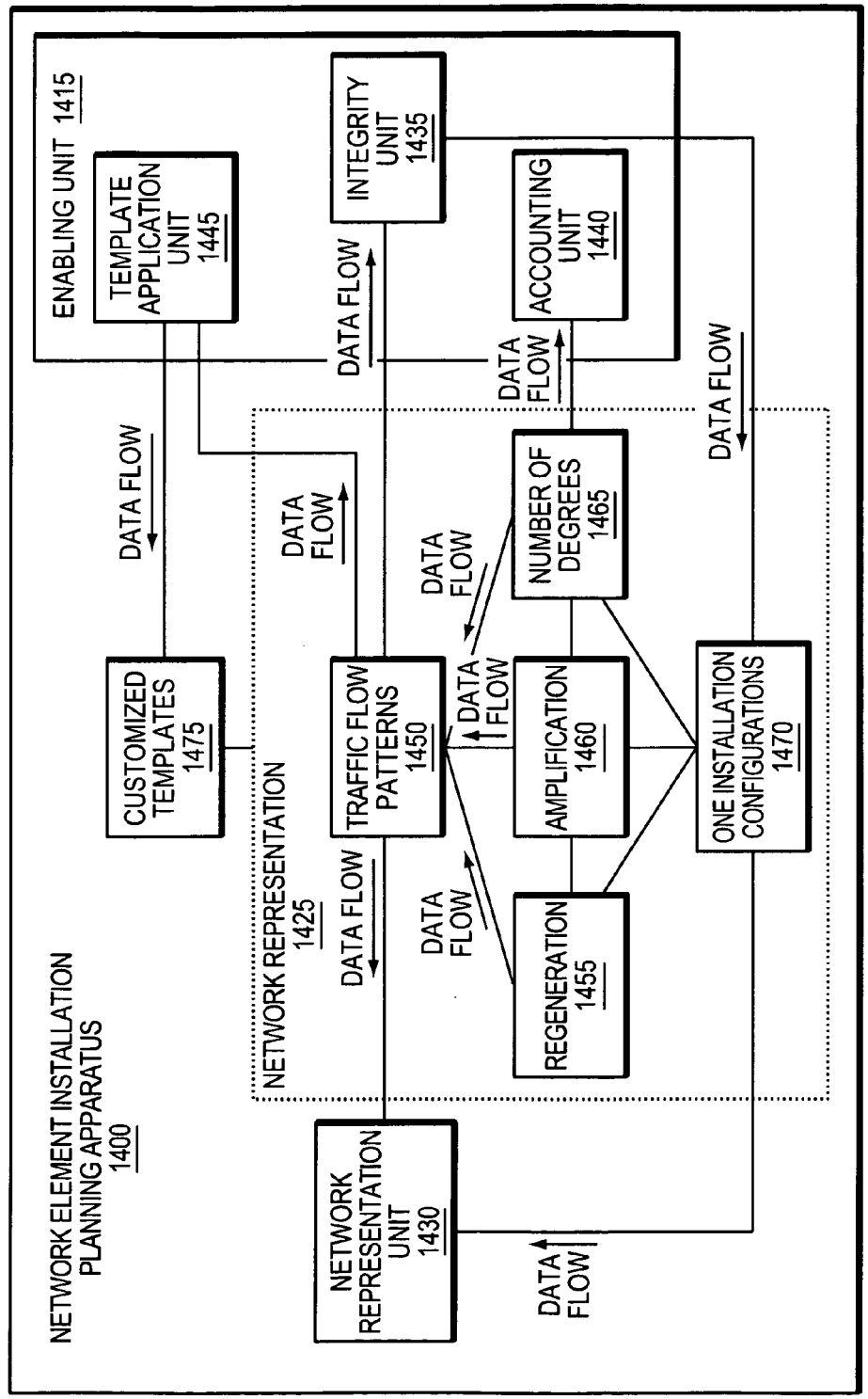

FIGS. 14A and 14B are block diagrams that illustrate additional example embodiments of a network element installation planning apparatus 1400 according to the disclosed planning tool. Like the example shown in FIG. 13, the apparatus 1400 includes accessing, display, enabling, and indicating units 1405, 1410, 1415, 1420, which may be managed by a central processing unit (CPU) 1428 operating in conjunction with random access memory (RAM) 1428.

In the apparatus 1400, the accessing unit 1405 accesses generic installation configurations 1495 of network elements. In some embodiments, these generic installation configurations 1495 may be accessed from a data structure, such as a database.

The display unit 1410 displays customizable templates to a user. These customizable templates may include generic installation configurations 1495 and customizable options within the generic installation configurations 1495 to enable the user to select or customize a template. In some embodiments, the customizable templates may be displayed to the user in different display formats 1438, such as a tabular template 1422, graphical template 1424, pictorial template 1426, or combination of different formats.

Next, the enabling unit 1415 enables the user to change the customizable options of the generic installation configurations 1495 to allow the user to produce customized templates 1475 of multiple network element installation configurations. After the user indicates that he or she has completed making changes to the customizable templates, a storage unit 1420 stores the customized templates 1475. The customized templates 1475 may be stored in a data structure such as a database, server, or any other contemplated storage unit 1420.

In the apparatus 1400, a network representation unit 1435 (FIG. 14B) may represent an optical network 1425 with multiple optical network element installation configurations 1470 and traffic flow patterns 1450.

The enabling unit 1415 may include an integrity unit 1435 to identify locations about the optical network at which to place a subset of the multiple network element installation configurations 1470 while maintaining integrity of the traffic flow patterns 1450, the subset being selected from among the customized templates 1475. The integrity unit 1435 maintains integrity of the traffic flow patterns 1450 by accounting for amplification 1460 or regeneration 1455 of optical integrity signals within the traffic flow patterns 1450, for example. Other signaling may also be maintained by the integrity unit 1435. The enabling unit 1415 includes an accounting unit 1440 to account for the number of degrees 1465 associated with the network element installation configurations 1470. The enabling unit 1415 also includes a template application unit 1445 to apply customized templates 1475 consistent with maintaining the integrity of the traffic flow patterns 1450 associated with the degrees 1465.

The enabling unit 1415 may further include a changing unit 1402 (FIG. 14A) to enable the user to change the generic installation configurations 1495 according to user preferences.

A code associating unit 1404 is configured to associate codes, such as ordering codes, with the customized templates 1475. The enabling unit 1415 includes an ordering unit 1406 to enable the user to order network element installation configurations using the codes 1485. The code associating unit 1404 may be configured to associate a bill of materials 1440 with the codes 1485.

An indicating unit 1408 is configured to indicate to the user via an indicator within the customized templates 1475 that a discount 1480 may apply when ordering a network element installation configuration that includes a customized template 1475 with the indicator.

The enabling unit 1415 includes a customized template accessing unit 1412 to enable the user to access stored customized templates 1475. The enabling unit 1415 is configured to enable the user to associate the stored customized templates 1475 with representations of network element installation configurations 1470 (FIG. 14B) about a representation of a network 1425.

The storage unit 1420 is configured to store the association of the network representation 1425 with the customized templates 1475 representing network element installation configurations 1470 (FIG. 14B).

The enabling unit 1415 includes a template update unit 1414 (FIG. 14A) to enable the user to update the customized templates 1475. The enabling unit 1415 also includes a template deletion unit 1416 to enable the user to delete the customized templates 1475. The enabling unit 1415 further includes an network representation update unit 1418 to enable the user to update the association of the network representation 1425 with the customized templates 1475 representing network element installation configurations 1470 (FIG. 14B).

It should be understood that the examples presented herein may include more or fewer components, be partitioned into subunits, or be implemented in different combinations. Moreover, the flow diagrams of FIGS. 8-12 may be implemented in hardware, firmware, or software. Any of the disclosed structures could be implemented in the form of a data structure such as a database, software written in any suitable programming language such as object oriented languages including but not limited to C++, Java, C#, .NET, and VB.NET or non-object oriented languages such as C, or any other contemplated structure or manifestation of logic. The software may be embodied on any form of computer readable medium, such as Random Access Memory (RAM), Read-Only Memory (ROM), or magnetic or optical disk and loaded and executed by generic or custom processor(s). Further, these disclosed structures and manifestations of logic could be running on hardware such as servers or computers.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of simplifying planning of multiple network element installation configurations, the method comprising:
   accessing generic installation configurations of optical network elements;
   displaying customizable templates to a user that include the generic installation configurations and customizable options within the generic installation configurations to enable the user to select or customize a customizable template of an optical network element installation;

enabling the user to change the generic installation configurations according to the customizable options to allow the user to produce customized templates of the multiple network element installation configurations including optical network element installations;

representing a network with multiple network element installations and traffic flow patterns; and identifying locations about the network at which to place a subset of the multiple network element installations while maintaining integrity of the traffic flow patterns by accounting for amplification or regeneration of optical signals within the traffic flow patterns, the subset being selected from among the customized templates.

2. The method according to claim 1 further including:
accounting for a number of degrees associated with the network element installation configurations; and
applying customized templates consistent with maintaining the integrity of the traffic flow patterns associated with the degrees.

3. The method according to claim 1 further including enabling the user to change the generic installation configurations according to user preferences.

4. The method according to claim 1 further including:
associating codes with the customized templates; and
enabling the user to order network element installation configurations using the codes.

5. The method according to claim 3 further including associating a bill of materials with the codes.

6. The method according to claim 1 further including indicating to the user by way of an indicator within the customized templates that a discount applies when ordering a network element installation configuration that includes a customized template with the indicator.

7. The method according to claim 1 further including:
storing the customized templates;
enabling the user to access the stored customized templates;
enabling the user to associate the stored customized templates with representations of network element installation configurations about the representation of the network; and
storing the representation of the network with the representations of the network element installation configurations.

8. The method according to claim 7 further including enabling the user to update the customized templates.

9. The method according to claim 7 further including enabling the user to delete the customized templates.

10. The method according to claim 7 further including enabling the user to update the representations of the network element installation configurations.

11. The method according to claim 1 further including displaying the customizable templates to the user in tabular format, graphical format, pictorial format, or any combination of these formats.

12. The method according to claim 1 wherein the customized templates stored are accessible to the user to visualize and plan the multiple network element installation configurations, including the placement of the optical network element installations on racks at sites within an optical network.

13. The method according to claim 1, wherein the optical network elements include an add/drop multiplexer, cross-connect, amplifier, regenerator, transponder, filter, router, wavelength switch, wavelength converter, wavelength selector or any combination thereof.

14. The method according to claim 1, further comprising storing the customized templates.

15. An apparatus for simplifying planning of multiple network element installation configurations, the apparatus comprising:
a central processing unit (CPU) in operative communication with memory, the CPU including:
a generic installation configuration accessing unit to access generic installation configurations of optical network elements;
a display unit to display customizable templates to a user that include the generic installation configurations and customizable options within the generic installation configurations to enable the user to select or customize a customizable template of an optical network element installation;
an enabling unit to enable the user to change the generic installation configurations according to the customizable options to allow the user to produce customized templates of the multiple network element installation configurations including optical network element installations;
a network representation unit to represent a network with multiple network element installations and traffic flow patterns; and
an integrity unit to identify locations about the network at which to place a subset of the multiple network element installations while maintaining integrity of the traffic flow patterns by accounting for amplification or regeneration of optical signals within the traffic flow patterns, the subset being selected from among the customized templates.

16. The apparatus according to claim 15 wherein the enabling unit includes:
an accounting unit to account for a number of degrees associated with the network element installation configurations; and
a template application unit to apply customized templates consistent with maintaining the integrity of the traffic flow patterns associated with the degrees.

17. The apparatus according to claim 15 wherein the enabling unit includes a changing unit to enable the user to change the generic installation configurations according to user preferences.

18. The apparatus according to claim 17 wherein the code associating unit is configured to associate a bill of materials with the codes.

19. The apparatus according to claim 15 wherein:
a code associating unit is configured to associate codes with the customized templates; and
the enabling unit includes an ordering unit to enable the user to order network element installation configurations using the codes.

20. The apparatus according to claim 15 wherein an indicating unit is configured to indicate to the user by way of an indicator within the customized templates that a discount applies when ordering a network element installation configuration that includes a customized template with the indicator.

21. The apparatus according to claim 15 further comprising a storage unit to store the customized templates and wherein:
the enabling unit includes a customized template accessing unit to enable the user to access the stored customized templates;
the enabling unit is configured to enable the user to associate the stored customized templates with representations of network element installation configurations about the representation of the network; and the storage unit is configured to store the representation of the network with the representations of the network element installation configurations.

22. The apparatus according to claim 21 wherein the enabling unit includes a template update unit to enable the user to update the customized templates.

23. The apparatus according to claim 21 wherein the enabling unit includes a template deletion unit to enable the user to delete the customized templates.

24. The apparatus according to claim 21 wherein the enabling unit includes a network representation update unit to enable the user to update the representations of the network element installation configurations.

25. The apparatus according to claim 15 wherein the display unit is configured to display the customizable templates to the user in tabular format, graphical format, pictorial format, or any combination of these formats.

26. The apparatus according to claim 15, further comprising a storage unit to store the customized templates.

27. A non-transitory computer program product for simplifying the planning of multiple network element installation configurations, the computer program product comprising a computer readable medium having computer readable instructions stored thereon, which, when loaded and executed by a processor, cause the processor to:
access generic installation configurations of optical network elements;
display customizable templates to a user that include the generic installation configurations and customizable options within the generic installation configurations to enable the user to select or customize a customizable template of an optical network element installation;
enable the user to change the generic installation configurations according to the customizable options to allow the user to produce customized templates of the multiple network element installation configurations including optical network element installations;
represent a network with multiple network element installations and traffic flow patterns; and
identify locations about the network at which to place a subset of the multiple network element installations while maintaining integrity of the traffic flow patterns by accounting for amplification or regeneration of optical signals within the traffic flow patterns, the subset being selected from among the customized templates.

28. The non-transitory computer program product according to claim 27, wherein the processor is further caused to store the customized templates.

29. A method of simplifying tracking of multiple optical network element installation configurations, the method comprising:
accessing generic installation configurations of multiple optical network element installations deployed in an optical communications network;
displaying customizable templates to a user that include the generic installation configurations of the multiple optical network elements and customizable options within the generic installation configurations to enable the user to select or customize a customizable template;
enabling the user to change the generic installation configurations according to the customizable options to allow the user to produce customized templates of the multiple optical network element installation configurations;
representing a network with multiple network element installations and traffic flow patterns; and
identifying locations about the network at which to place a subset of the multiple network element installations while maintaining integrity of the traffic flow patterns by accounting for amplification or regeneration of optical signals within the traffic flow patterns, the subset being selected from among the customized templates.

30. The method according to claim 29, further comprising storing the customized templates.

31. A method of simplifying planning of multiple network element installation configurations, the method comprising:
accessing generic installation configurations of optical network elements;
displaying customizable templates to a user that include the generic installation configurations and customizable options within the generic installation configurations to enable the user to select or customize a customizable template of an optical network element installation;
enabling the user to change the generic installation configurations according to the customizable options to allow the user to produce customized templates of the multiple network element installation configurations including optical network element installations;
representing a network with multiple network element installations and traffic flow patterns;
identifying locations about the network at which to place a subset of the multiple network element installations while maintaining integrity of the traffic flow patterns, the subset being selected from among the customized templates;
accounting for a number of degrees associated with the network element installation configurations; and
applying customized templates consistent with maintaining the integrity of the traffic flow patterns associated with the degrees.

32. An apparatus for simplifying planning of multiple network element installation configurations, the apparatus comprising:
a central processing unit (CPU) in operative communication with memory, the CPU including:
a generic installation configuration accessing unit to access generic installation configurations of optical network elements;
a display unit to display customizable templates to a user that include the genetic installation configurations and customizable options within the generic installation configurations to enable the user to select or customize a customizable template of an optical network element installation;
an enabling unit to enable the user to change the generic installation configurations according to the customizable options to allow the user to produce customized templates of the multiple network element installation configurations including optical network element installations;
a network representation unit to represent a network with multiple network element installations and traffic flow patterns;
an integrity unit to identify locations about the network at which to place a subset of the multiple network element installations while maintaining integrity of the traffic flow patterns, the subset being selected from among the customized templates;
an accounting unit to account for a number of degrees associated with the network element installation configurations; and a template application unit to apply customized templates consistent with maintaining the integrity of the traffic flow patterns associated with the degrees.

* * * * *

UNITED STATES PATENT AND TRADEMARK OFFICE
CERTIFICATE OF CORRECTION

PATENT NO. : 9,112,789 B2  
APPLICATION NO. : 12/228826  
DATED : August 18, 2015  
INVENTOR(S) : Ramasubramanian Anand et al.

Page 1 of 1

It is certified that error appears in the above-identified patent and that said Letters Patent is hereby corrected as shown below:

In the Claims  
Claim 32, Column 16, Line 46: Please delete "genetic" and insert --generic--

Signed and Sealed this  
Fifth Day of January, 2016

Michelle K. Lee  
*Director of the United States Patent and Trademark Office*